United States Patent
Hara

(10) Patent No.: US 12,452,539 B2
(45) Date of Patent: Oct. 21, 2025

(54) MOVING IMAGE GENERATION APPARATUS, MOVING IMAGE GENERATION METHOD, PROGRAM, AND RECORDING MEDIUM

(71) Applicant: Takayuki Hara, Kanagawa (JP)

(72) Inventor: Takayuki Hara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/267,801

(22) PCT Filed: Dec. 20, 2021

(86) PCT No.: PCT/JP2021/047061
§ 371 (c)(1),
(2) Date: Jun. 16, 2023

(87) PCT Pub. No.: WO2022/138574
PCT Pub. Date: Jun. 30, 2022

(65) Prior Publication Data
US 2024/0048850 A1 Feb. 8, 2024

(30) Foreign Application Priority Data
Dec. 25, 2020 (JP) .................. 2020-217197

(51) Int. Cl.
*H04N 23/698* (2023.01)
*G06T 3/4038* (2024.01)
*G06T 3/4046* (2024.01)

(52) U.S. Cl.
CPC ......... *H04N 23/698* (2023.01); *G06T 3/4038* (2013.01); *G06T 3/4046* (2013.01)

(58) Field of Classification Search
CPC .... H04N 23/698; H04N 23/69; H04N 23/695; G06T 3/4038; G06T 3/4046; G06T 15/10; G06V 10/82; G06V 20/20; G06V 10/22
See application file for complete search history.

(56) References Cited

U.S. PATENT DOCUMENTS

| | | |
|---|---|---|
| 2005/0264851 A1 | 12/2005 | Hara |
| 2006/0147084 A1 | 7/2006 | Hara |

(Continued)

FOREIGN PATENT DOCUMENTS

| | | |
|---|---|---|
| EP | 3641298 | 4/2020 |
| JP | 2004-241834 | 8/2004 |

(Continued)

OTHER PUBLICATIONS

International Search Report for PCT/JP2021/047061 mailed on Feb. 28, 2022, 11 pages.

*Primary Examiner* — Farzana Hossain
(74) *Attorney, Agent, or Firm* — XSENSUS LLP

(57) ABSTRACT

The present invention relates to a moving image generation apparatus that generates a moving image having a normal angle of view from a plurality of panoramic images. The moving image generation apparatus includes a goodness-of-fit-index calculation unit 103 configured to calculate goodness-of-fit-indices of camerawork types of a virtual camera with respect to the plurality of panoramic images, a type allocation unit 104 configured to determine an allocation of the camerawork types to the plurality of panoramic images based on the goodness-of-fit-indices and a frequency of occurrence of each camerawork type, and a moving image encoding unit 105 configured to create the moving image having the normal angle of view from the plurality of panoramic images with the allocated camerawork types.

15 Claims, 18 Drawing Sheets

(56) References Cited

U.S. PATENT DOCUMENTS

| | | | |
|---|---|---|---|
| 2006/0164693 | A1 | 7/2006 | Matsumoto et al. |
| 2007/0110273 | A1 | 5/2007 | Hara |
| 2008/0180752 | A1 | 7/2008 | Hara |
| 2009/0021794 | A1 | 1/2009 | Hara et al. |
| 2009/0201556 | A1 | 8/2009 | Hara |
| 2010/0027906 | A1 | 2/2010 | Hara et al. |
| 2010/0066745 | A1 | 3/2010 | Tsuda et al. |
| 2010/0091113 | A1 | 4/2010 | Morioka et al. |
| 2011/0119555 | A1 | 5/2011 | Hara |
| 2011/0274350 | A1 | 11/2011 | Hara |
| 2012/0121203 | A1 | 5/2012 | Hara |
| 2012/0229829 | A1 | 9/2012 | Hara |
| 2014/0267624 | A1 | 9/2014 | Hara |
| 2014/0347526 | A1 | 11/2014 | Hara et al. |
| 2015/0043827 | A1 | 2/2015 | Hara |
| 2015/0254819 | A1 | 9/2015 | Hara |
| 2015/0319415 | A1 | 11/2015 | Hara |
| 2016/0104510 | A1 | 4/2016 | Tamir et al. |
| 2016/0140714 | A1 | 5/2016 | Hara |
| 2018/0039856 | A1 | 2/2018 | Hara |
| 2018/0260646 | A1 | 9/2018 | Hara |
| 2019/0028642 | A1 | 1/2019 | Fujita et al. |
| 2019/0132521 | A1 | 5/2019 | Fujita et al. |
| 2020/0013374 | A1 | 1/2020 | Ogawara et al. |
| 2020/0167959 | A1 | 5/2020 | Shen et al. |
| 2020/0334862 | A1 | 10/2020 | Hara et al. |
| 2020/0374463 | A1 | 11/2020 | Fujita et al. |
| 2021/0192684 | A1* | 6/2021 | Pardeshi ................ G06N 3/045 |

FOREIGN PATENT DOCUMENTS

| | | | | |
|---|---|---|---|---|
| JP | 2005-056101 | 3/2005 | | |
| JP | 2005-341493 | 12/2005 | | |
| JP | 2006-155241 | 6/2006 | | |
| JP | 2006-172037 | 6/2006 | | |
| JP | 2006-180261 | 7/2006 | | |
| JP | 2006-180262 | 7/2006 | | |
| JP | 2006-180263 | 7/2006 | | |
| JP | 2006-191520 | 7/2006 | | |
| JP | 2006-222570 | 8/2006 | | |
| JP | 2006-229874 | 8/2006 | | |
| JP | 2006-313994 | 11/2006 | | |
| JP | 2007-142490 | 6/2007 | | |
| JP | 2007-143123 | 6/2007 | | |
| JP | 2007-174178 | 7/2007 | | |
| JP | 3944456 | 7/2007 | | |
| JP | 2008-019215 | 1/2008 | | |
| JP | 2008-193137 | 8/2008 | | |
| JP | 2008-227859 | 9/2008 | | |
| JP | 2009-044726 | 2/2009 | | |
| JP | 2009-076968 | 4/2009 | | |
| JP | 2009-188965 | 8/2009 | | |
| JP | 2010-041710 | 2/2010 | | |
| JP | 2010-057157 | 3/2010 | | |
| JP | 2010-093466 | 4/2010 | | |
| JP | 2010-109816 | 5/2010 | | |
| JP | 2010-218110 | 9/2010 | | |
| JP | 2011-039675 | 2/2011 | | |
| JP | 2011-119843 | 6/2011 | | |
| JP | 2011-193336 | 9/2011 | | |
| JP | 2012-186738 | 9/2012 | | |
| JP | 2013-065946 | 4/2013 | | |
| JP | 2013-098802 | 5/2013 | | |
| JP | 2013-143599 | 7/2013 | | |
| JP | 2013-171423 | 9/2013 | | |
| JP | 2013-186560 | 9/2013 | | |
| JP | 2014-131091 | 7/2014 | | |
| JP | 2014-178124 | 9/2014 | | |
| JP | 2014-178265 | 9/2014 | | |
| JP | 2015-015582 | 1/2015 | | |
| JP | 2015-022561 | 2/2015 | | |
| JP | 2015-036629 | 2/2015 | | |
| JP | 2015-158762 | 9/2015 | | |
| JP | 2015-171077 | 9/2015 | | |
| JP | 2016-100698 | 5/2016 | | |
| JP | 5861499 | * 6/2016 | ............ | G03B 15/00 |
| JP | 2016-212784 | 12/2016 | | |
| JP | 2016-219879 | 12/2016 | | |
| JP | 2017-033175 | 2/2017 | | |
| JP | 2017-034362 | 2/2017 | | |
| JP | 2017-207960 | 11/2017 | | |
| JP | 2017-208591 | 11/2017 | | |
| JP | 2017-208592 | 11/2017 | | |
| JP | 2018-022360 | 2/2018 | | |
| JP | 2018-151887 | 9/2018 | | |
| JP | 6432029 | 12/2018 | | |
| JP | 2019-022207 | 2/2019 | | |
| JP | 2019-036807 | 3/2019 | | |
| JP | 2019-080252 | 5/2019 | | |
| JP | 2020-013552 | 1/2020 | | |
| JP | 2020-154457 | 9/2020 | | |
| JP | 2020-177495 | 10/2020 | | |
| KR | 10-2020-0044714 | 4/2020 | | |

* cited by examiner

[Fig. 1A]
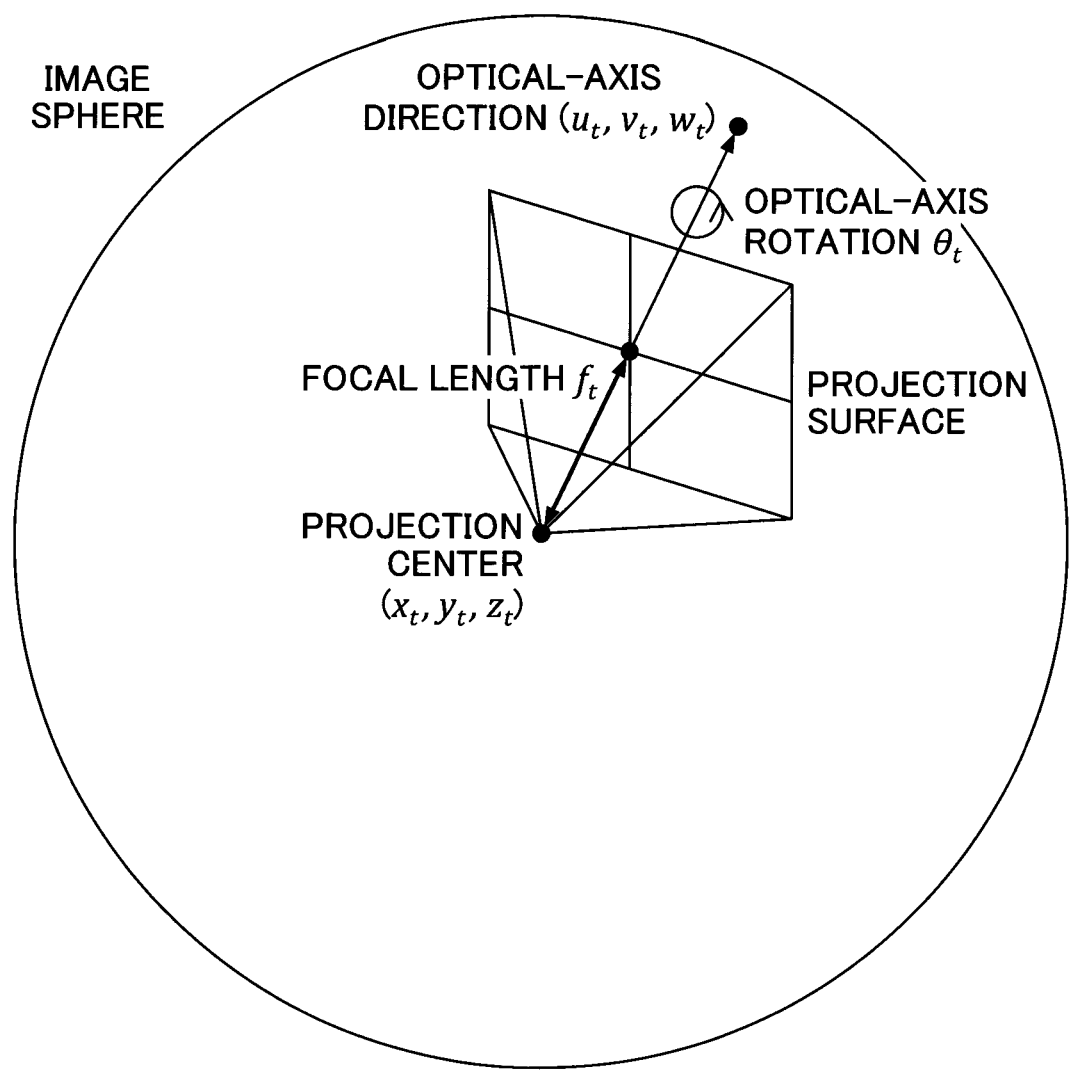

[Fig. 1B]

$$\begin{bmatrix} [x_1, y_1, z_1, u_1, v_1, w_1, \theta_1, f_1], \\ [x_2, y_2, z_2, u_2, v_2, w_2, \theta_2, f_2], \\ \ldots, \\ [x_T, y_T, z_T, u_T, v_T, w_T, \theta_T, f_T] \end{bmatrix}$$

[Fig. 2]
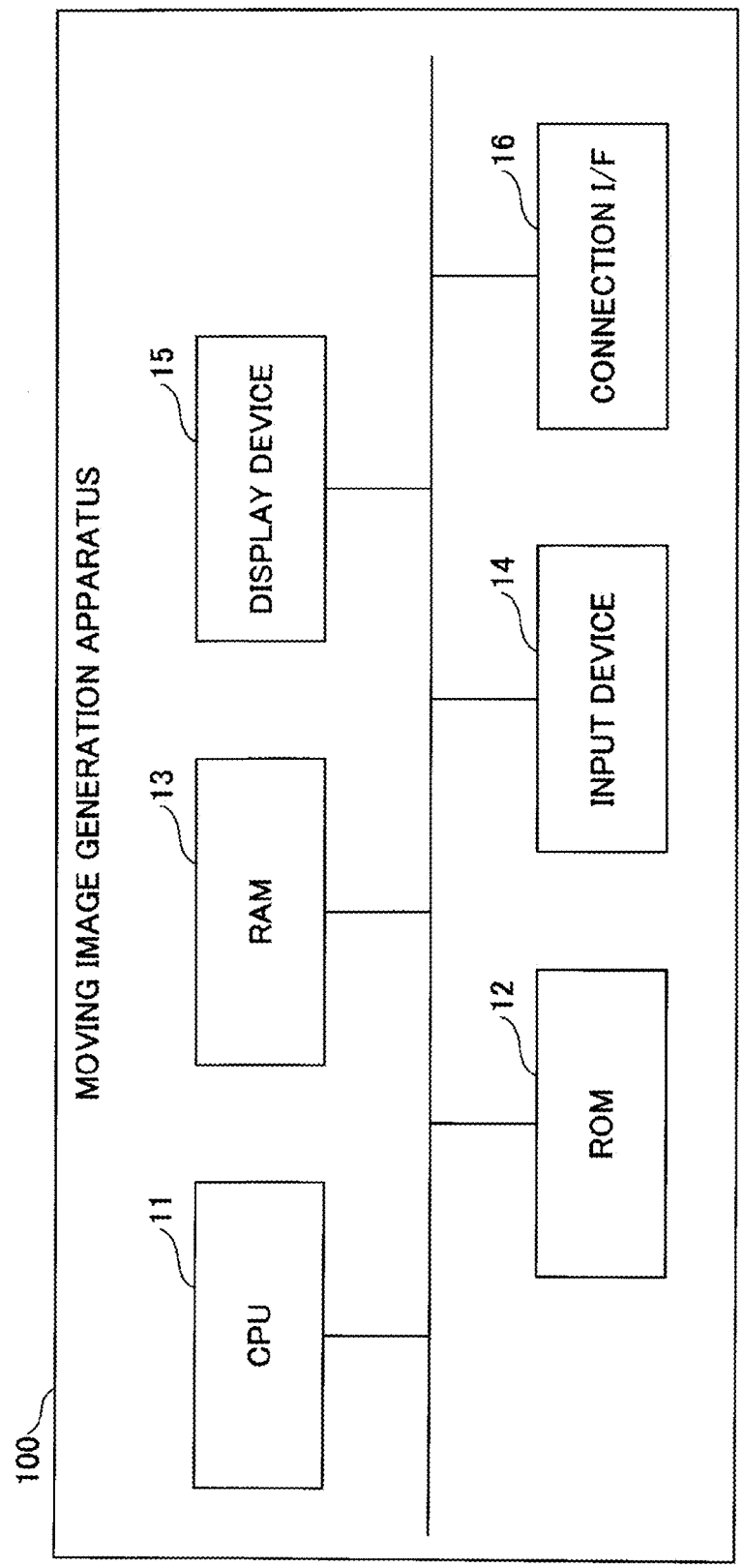

[Fig. 3]
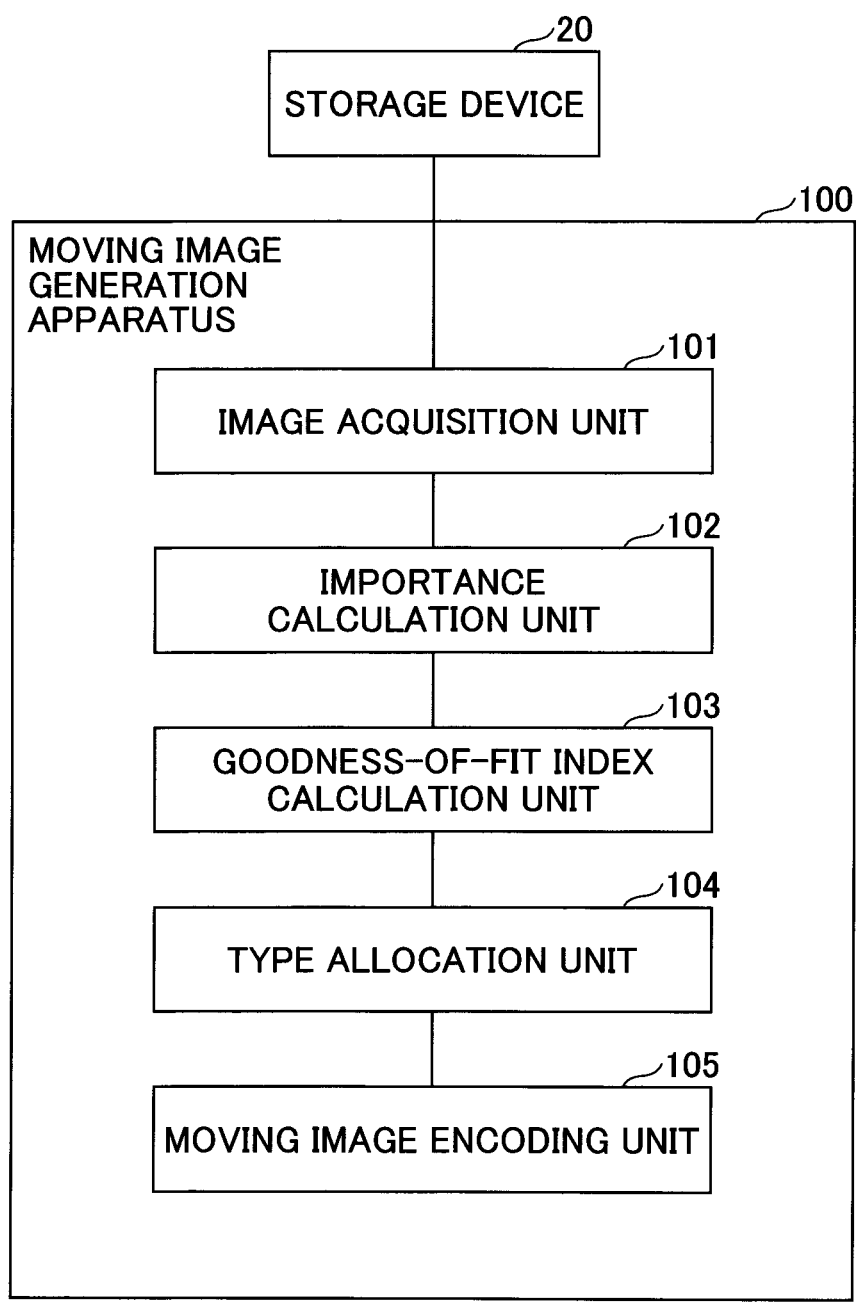

[Fig. 4]
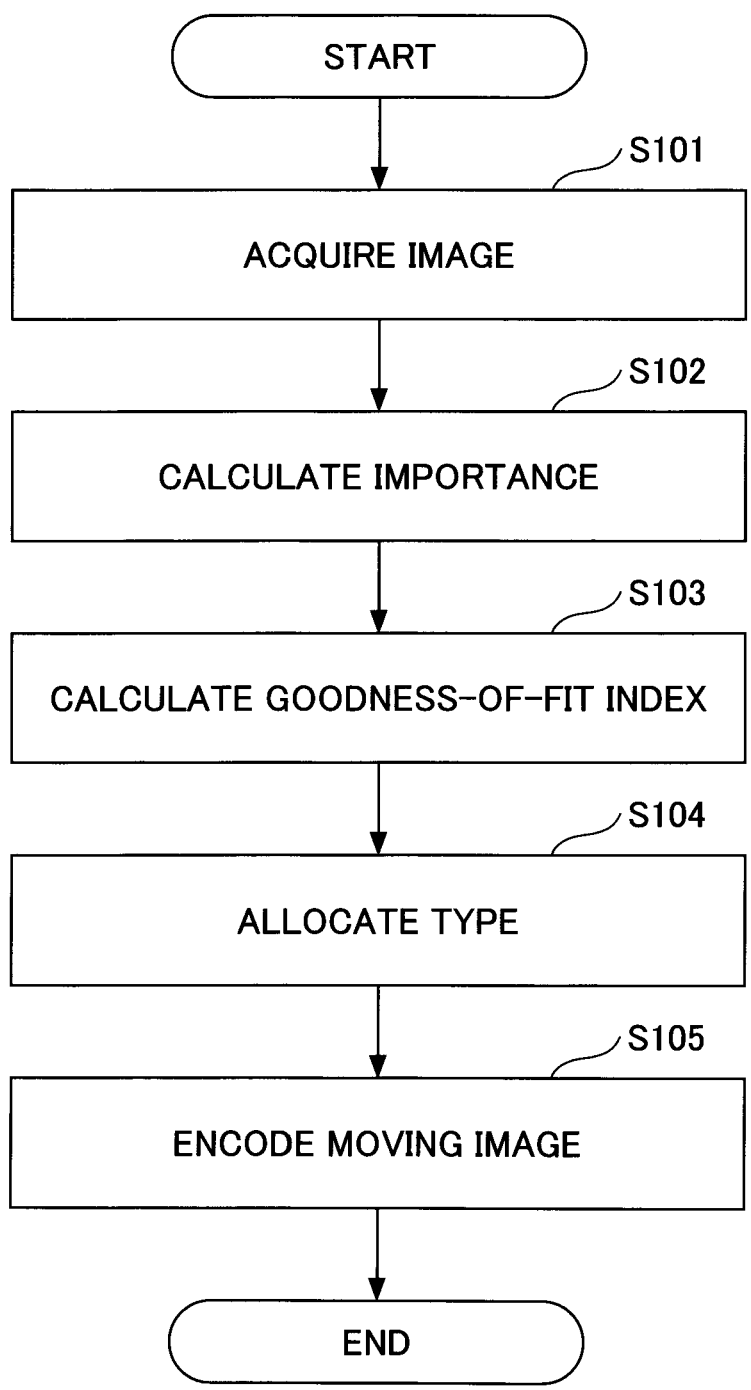

[Fig. 5A]
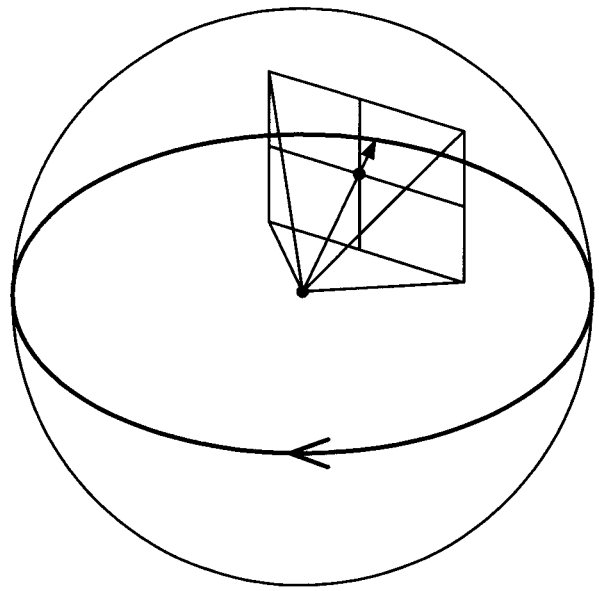
PROJECTION CENTER MOVING HORIZONTALLY
[Fig. 5B]
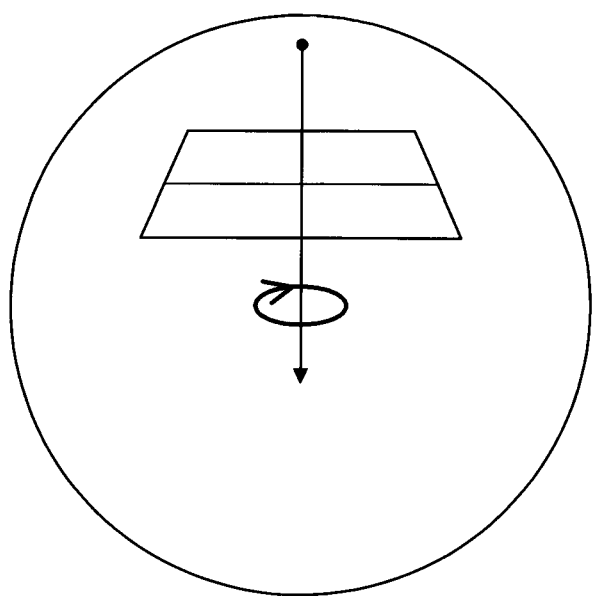
OPTICAL-AXIS ROTATING BY STEREOGRAPHIC
PROJECTION IN DIRECTION OF GRAVITY

[Fig. 5C]
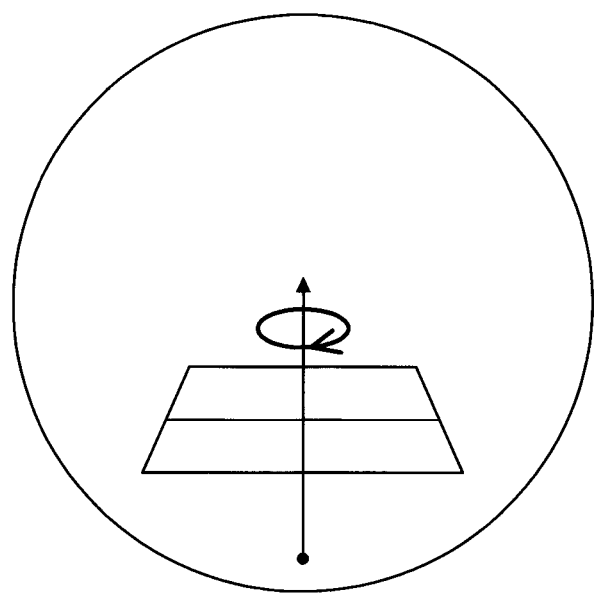
OPTICAL-AXIS ROTATING BY STEREOGRAPHIC
PROJECTION IN DIRECTION OF GRAVITY

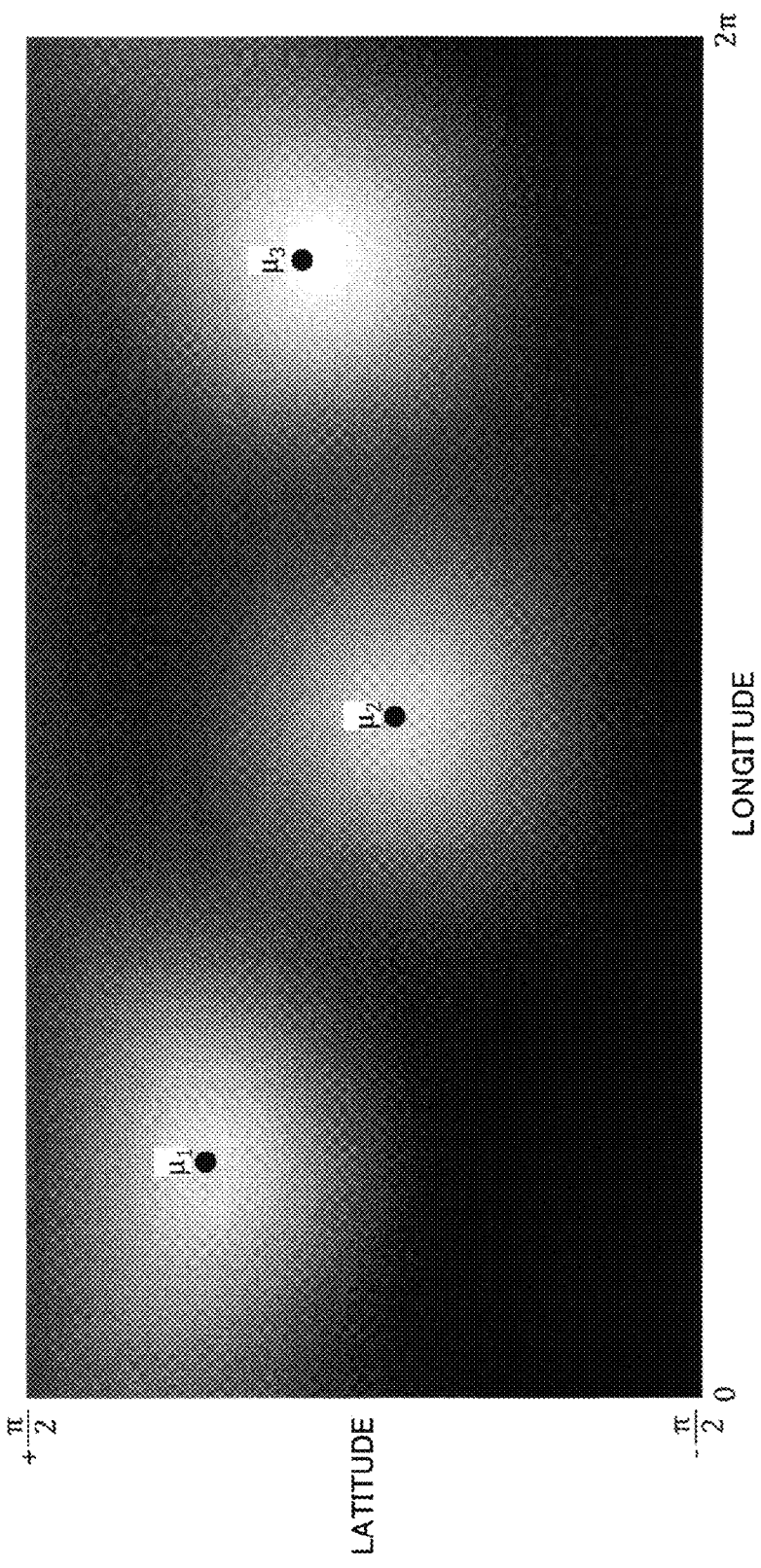
[Fig. 6]

[Fig. 7]
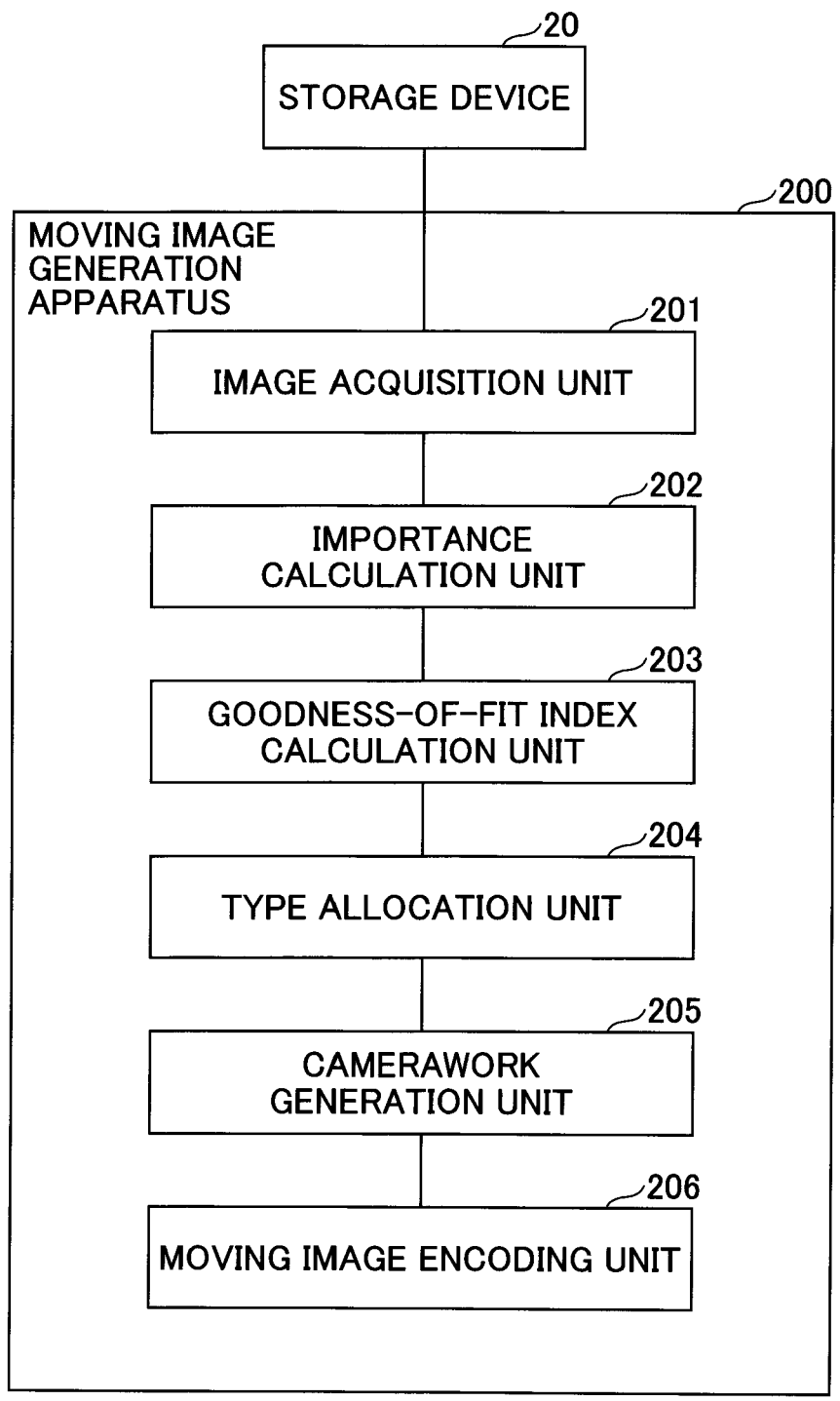

[Fig. 8]
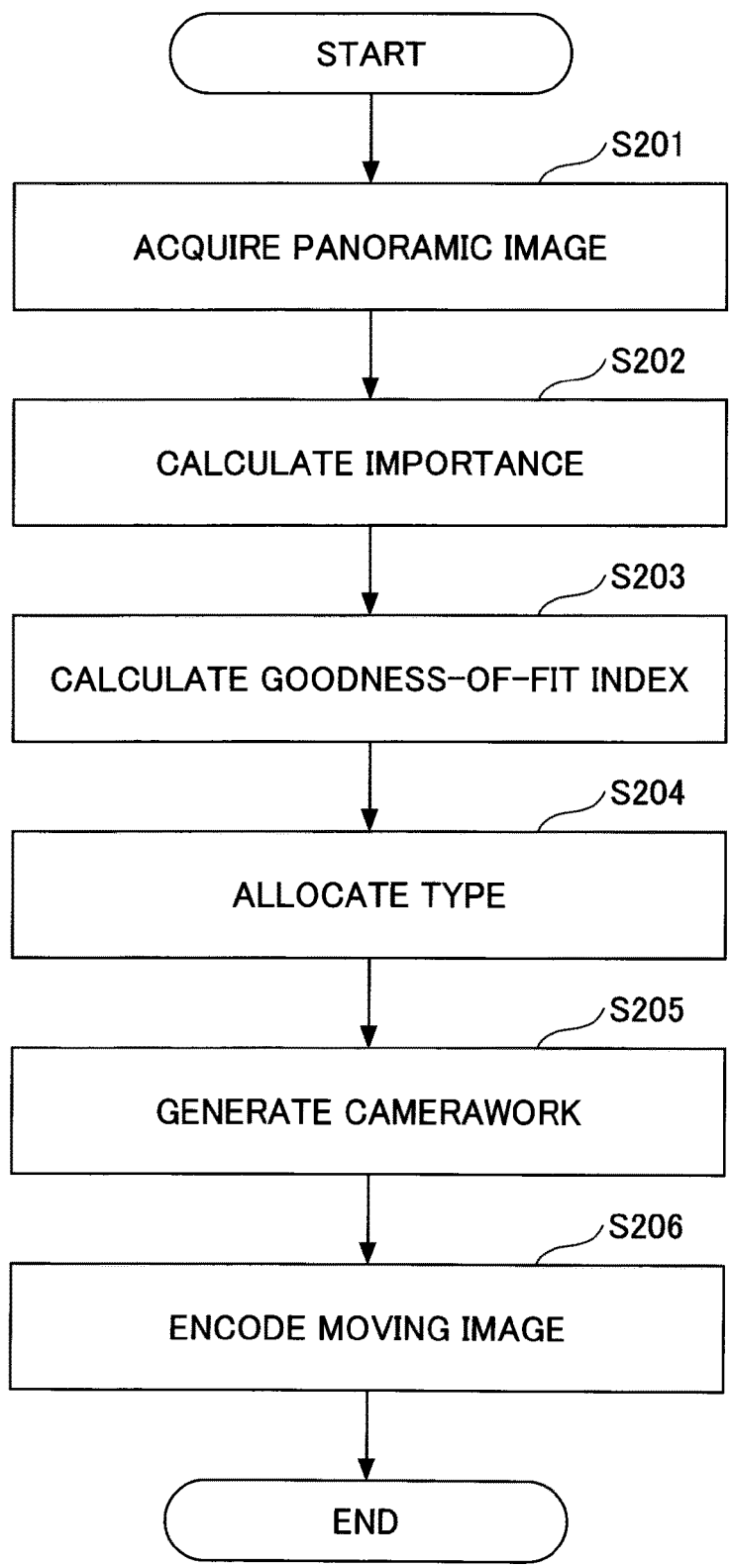

[Fig. 9A]
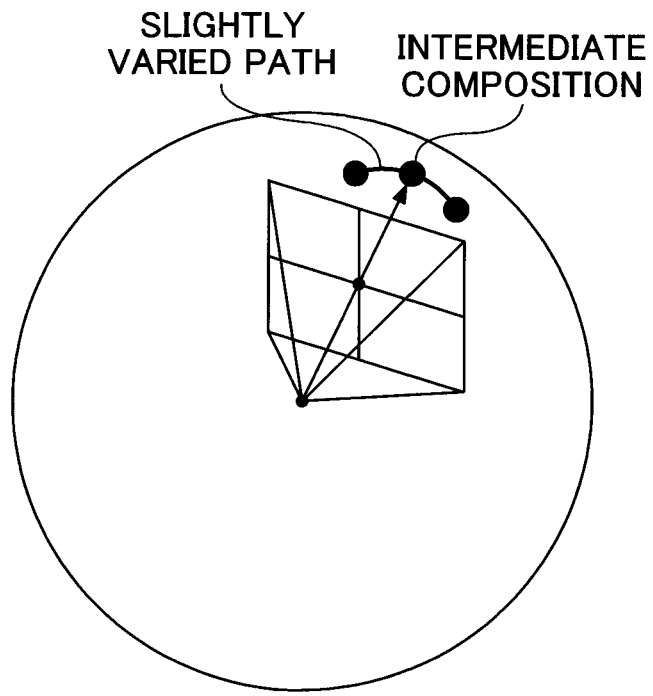
[Fig. 9B]
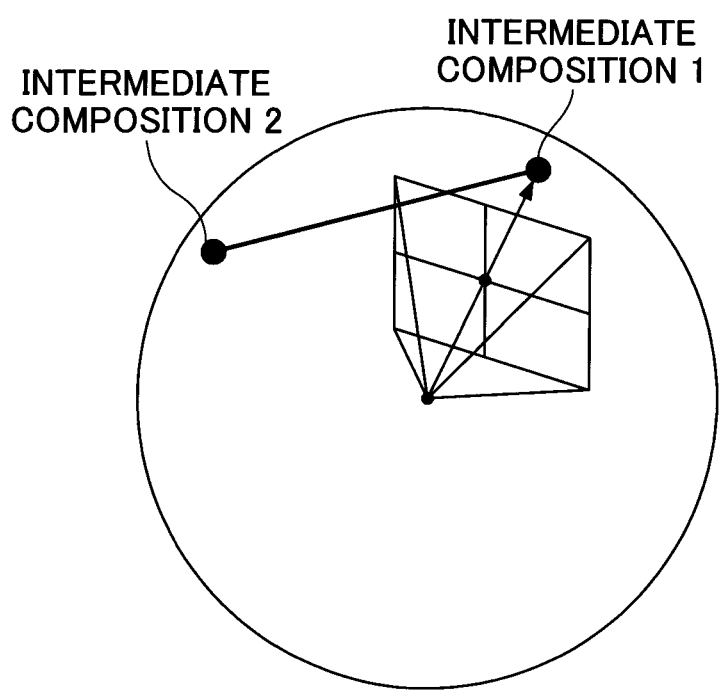

[Fig. 9C]
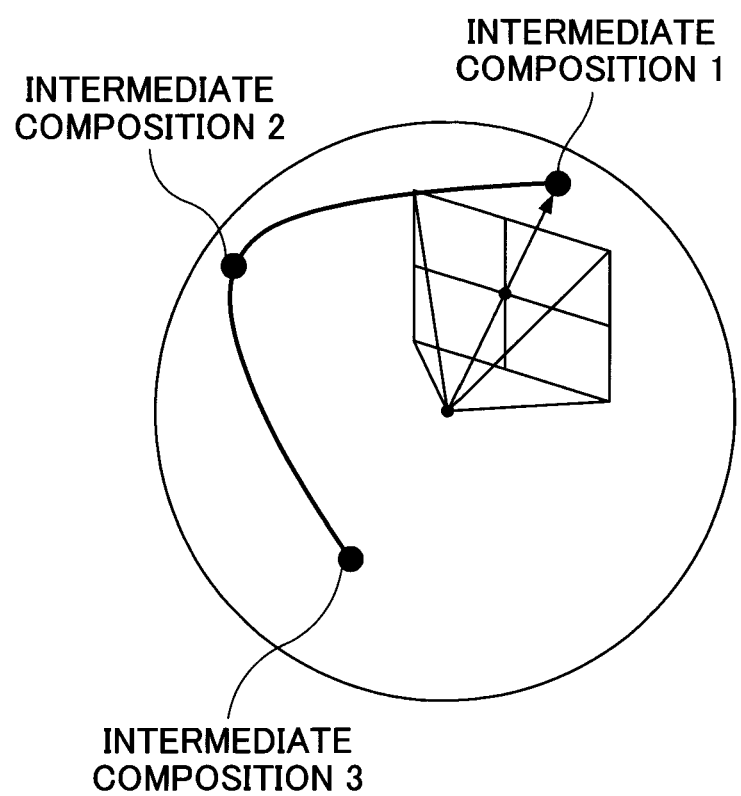

[Fig. 10]
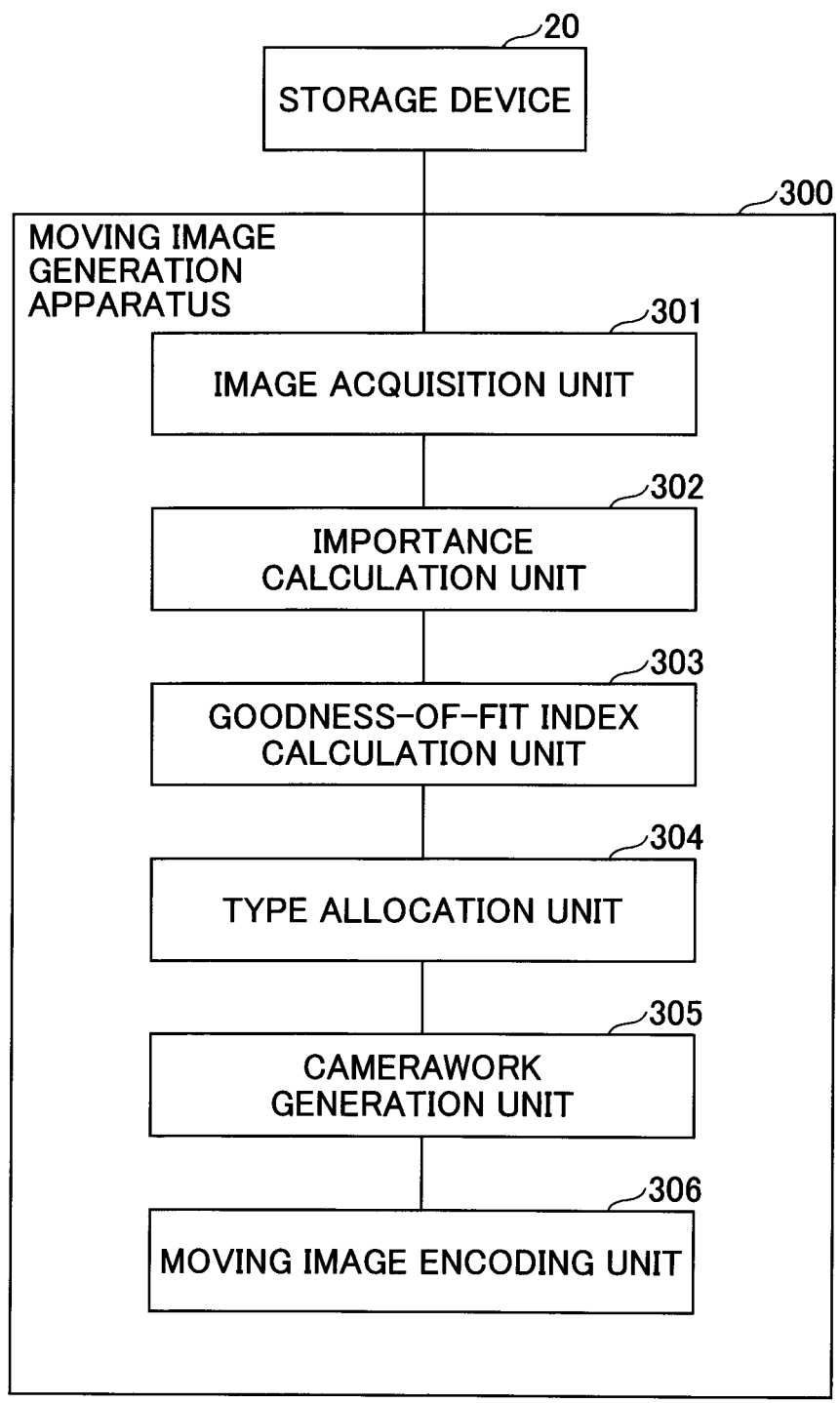

[Fig. 11]
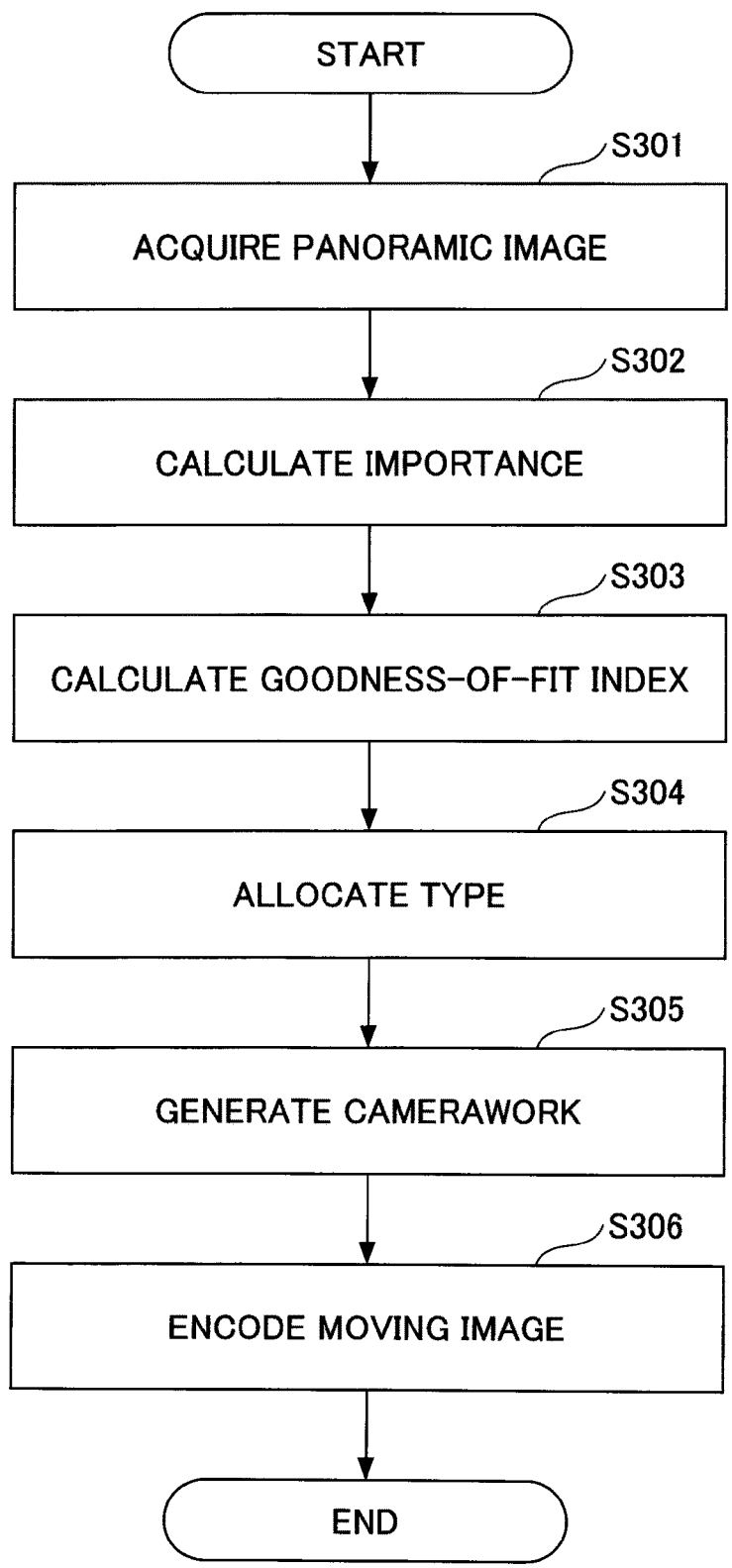

[Fig. 12]
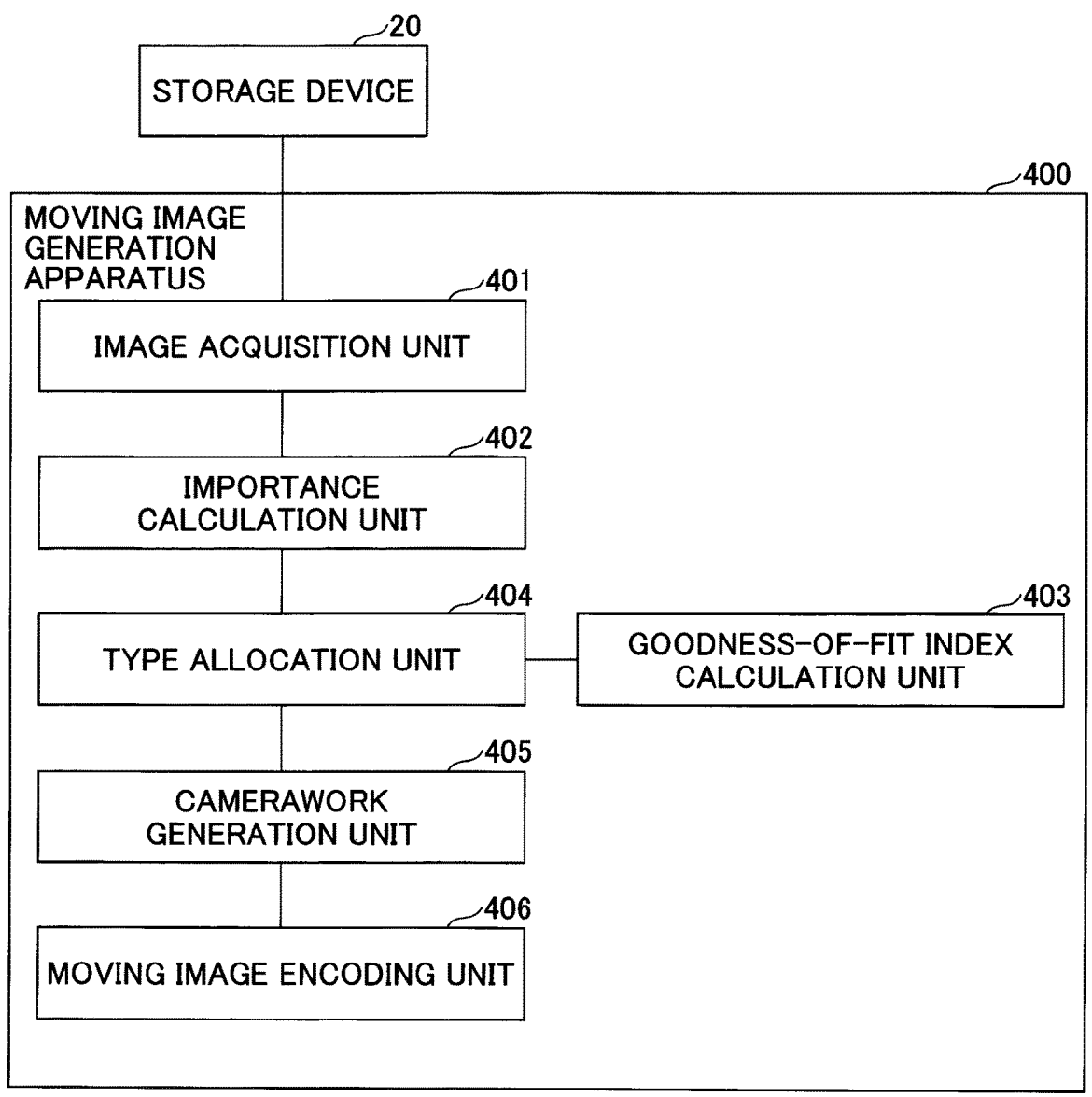

[Fig. 13]
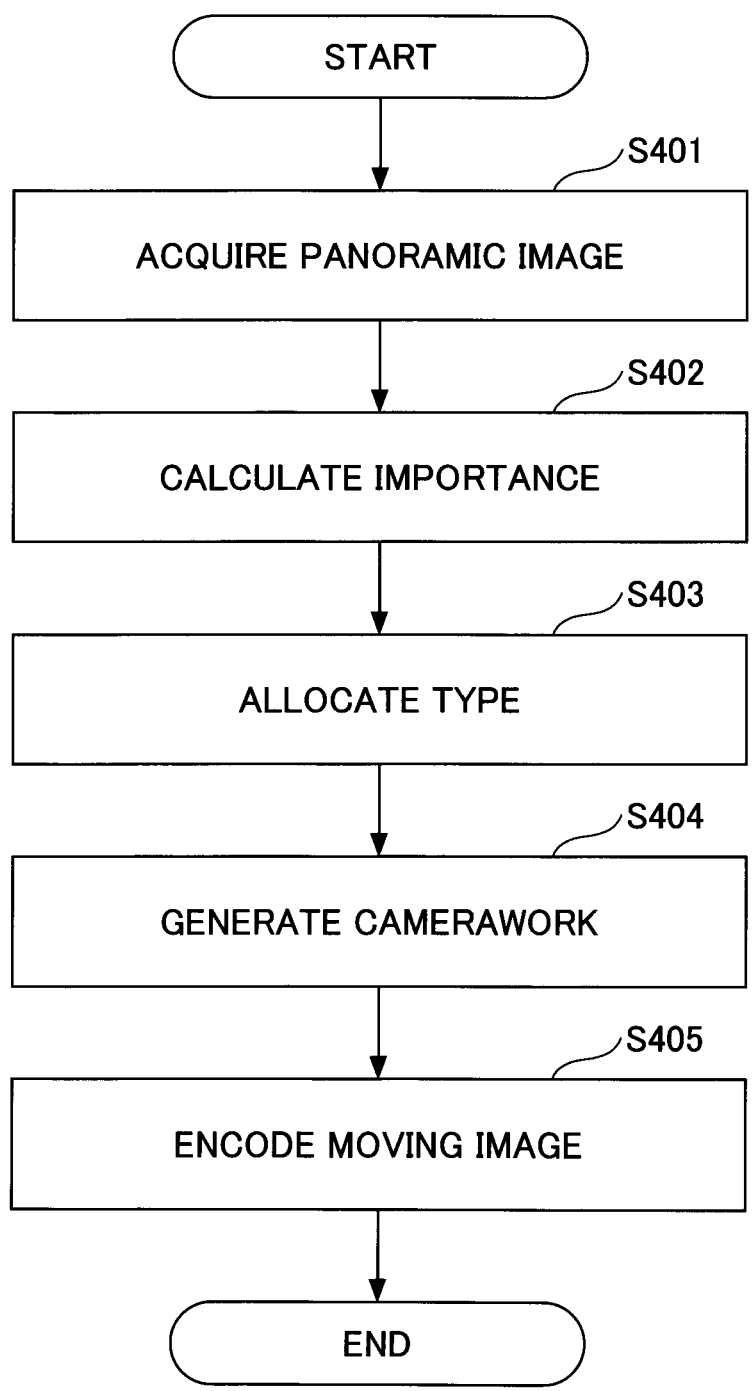

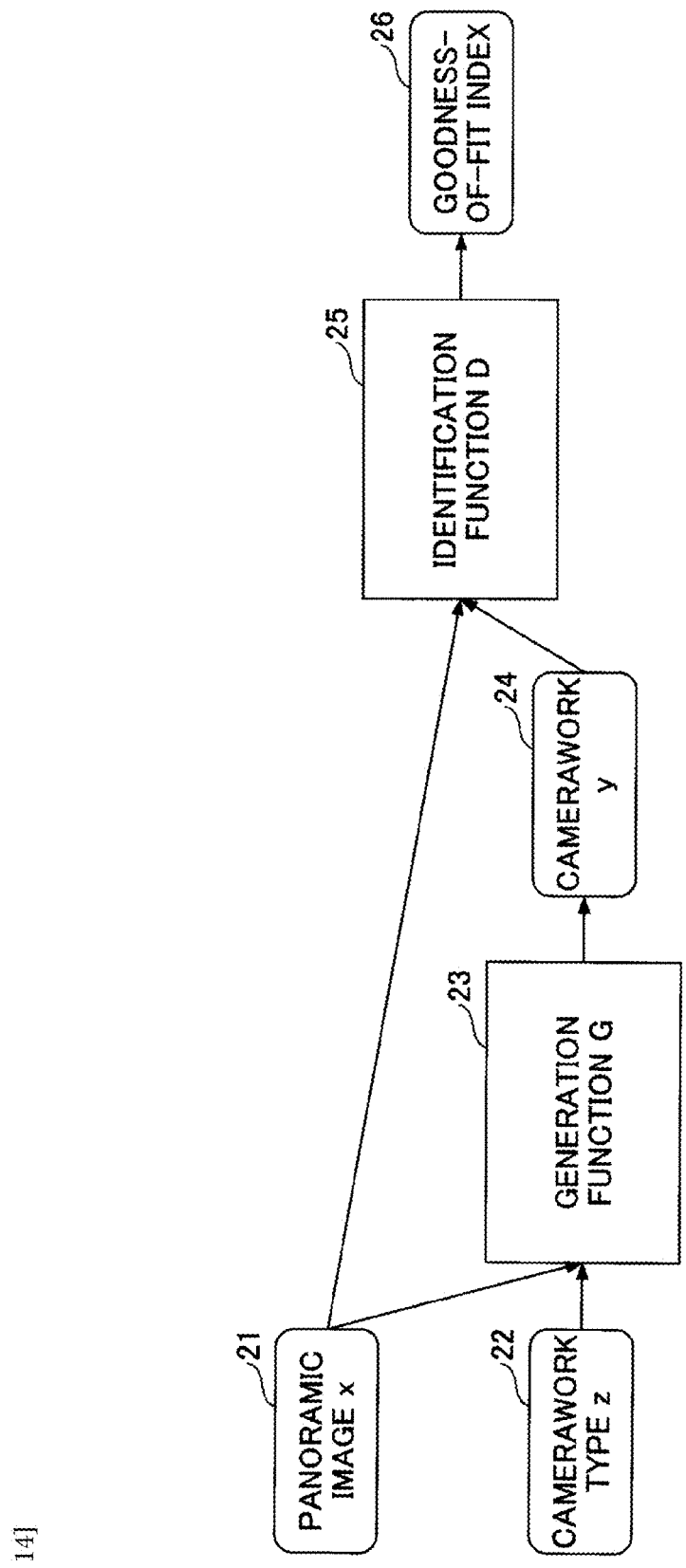
[Fig. 14]

[Fig. 15]

| CAMERAWORK TYPE | THE NUMBER OF INTERMEDIATE COMPOSITIONS | PATH INTERPOLATION | ACCELERATION/ DECELERATION MODEL |
|---|---|---|---|
| (D) | 1 | MINUTE VARIATION LINEAR INTERPOLATION | CONSTANT SPEED |
| (E) | 2 | LINEAR INTERPOLATION | MINIMUM JERK IN ACCELERATION |
| (F) | 3 | SPLINE INTERPOLATION | CONSTANT SPEED |

US 12,452,539 B2

MOVING IMAGE GENERATION APPARATUS, MOVING IMAGE GENERATION METHOD, PROGRAM, AND RECORDING MEDIUM

CROSS-REFERENCE TO RELATED APPLICATIONS

The present application is based on PCT filing PCT/JP2021/047061, filed Dec. 20, 2021, which claims priority to Japanese Patent Application No. 2020-217197, filed on Dec. 25, 2020, the entire contents of each are incorporated herein by its reference.

TECHNICAL FIELD

The present disclosure relates to a moving image generation apparatus, moving image generation method, program, and recording medium.

BACKGROUND ART

A technique for creating camerawork of a virtually presenting camera (hereinafter, referred to as a virtual camera) with respect to a panoramic image such as a spherical image to generate a moving image having a normal angle of view is known. The camerawork is a camera parameter (a position, an orientation, a focal length, or the like) of the virtual camera that changes in time series. An information processing device or the like can display a moving image when a panoramic image is viewed from various viewpoints by camerawork.

Patent Literature 1 discloses a technique for creating one moving image from a moving image captured by a multi-camera.

Patent Literature 2 discloses a technique for generating a moving image in which a subject is tracked from a panoramic image.

Patent Literature 3 discloses a technique for presenting a field of view as a moving image from a viewpoint moving along a predetermined route by cutting out a moving image from an omnidirectional moving image.

Patent Literature 4 discloses a technique for extracting an important area from one spherical image to generate a moving image in a form of transiting the important region.

These techniques are used to generate a moving image with respect to a panoramic moving image by treating the panoramic moving image as a set of multiple panoramic still images to generate a normal moving image with respect to multiple panoramic images.

SUMMARY OF INVENTION

Technical Problem

However, in a moving image having a normal angle of view created from a conventional panoramic image, it is necessary to improve the quality with respect to the camerawork from the viewpoint of a goodness-of-fit index with respect to each panoramic image and the correlation between the panoramic images.

In consideration of the above, an object of the present invention is to provide a moving image generation apparatus capable of generating a high-quality moving image having a normal angle of view from a panoramic image.

Solution to Problem

In order to achieve the above objectives, the present invention relates to a moving image generation apparatus including a goodness-of-fit-index calculation unit configured to calculate goodness-of-fit-indices of camerawork types of a virtual camera with respect to the plurality of panoramic images, a type allocation unit configured to determine an allocation of the camerawork types to the plurality of panoramic images based on the goodness-of-fit-indices and a frequency of occurrence of each camerawork type, and a moving image encoding unit configured to create the moving image having the normal angle of view from the plurality of panoramic images with the allocated camerawork types.

Advantageous Effects of Invention

A moving image generation apparatus capable of generating a high-quality moving image having a normal angle of view from a panoramic image can be provided.

BRIEF DESCRIPTION OF DRAWINGS

FIG. 1A is a diagram describing camera parameters;

FIG. 1B is a diagram describing camerawork types;

FIG. 2 is an example of a hardware configuration diagram of a moving image generation apparatus;

FIG. 3 is an example of a functional block diagram illustrating functions of the moving image generation apparatus as blocks;

FIG. 4 is an example of a flowchart illustrating a procedure in which the moving image generation apparatus generates camerawork (a first embodiment);

FIG. 5A is a diagram illustrating an example of a camerawork type;

FIG. 5B is a diagram illustrating an example of a camerawork type;

FIG. 5C is a diagram illustrating an example of a camerawork type;

FIG. 6 is a visualization of an example of a mixed von Mises-Fisher distribution;

FIG. 7 is an example of a functional block diagram illustrating functions of a moving image generation apparatus according to a second embodiment as blocks;

FIG. 8 is an example of a flowchart illustrating a procedure in which the moving image generation apparatus generates camerawork (the second embodiment);

FIG. 9A is a diagram illustrating an example of a camerawork type according to the second embodiment;

FIG. 9B is a diagram illustrating an example of a camerawork type according to the second embodiment;

FIG. 9C is a diagram illustrating an example of a camerawork type according to the second embodiment;

FIG. 10 is an example of a functional block diagram illustrating functions of a moving image generation apparatus according to a third embodiment as blocks;

FIG. 11 is an example of a flowchart illustrating a procedure in which the moving image generation apparatus generates camerawork (the third embodiment);

FIG. 12 is an example of a functional block diagram illustrating functions of a moving image generation apparatus according to a fourth embodiment as blocks;

FIG. 13 is an example of a flowchart illustrating a procedure in which the moving image generation apparatus generates camerawork (the fourth embodiment);

FIG. 14 is a diagram schematically illustrating a goodness-of-fit index output from the camerawork type and a panoramic image in CGAN; and FIG. 15 illustrates a comparison of the features of camerawork types.

DESCRIPTION OF EMBODIMENTS

Hereinafter, as an example of embodiments for implementing the present invention, a moving image generation apparatus and moving image generation method performed by the moving image generating apparatus will be described.

Terminology

Terms used in the present embodiment will be described first.

The term "camera parameters" refers to information that determines the viewpoint of a virtual camera in the three-dimensional space, and specifically to, for example, one or more of a position, an orientation, a focal length, an aspect ratio, and a lens distortion of a virtual camera.

The term "camerawork" refers to values of camera parameters arranged in time series.

The term "virtual camera" does not refer to a camera that is present in reality but refers to a camera that is virtually present and generates a capture image according to defined camera parameter values.

The term "goodness-of-fit index" refers to an index that reflects the aesthetic property of a corresponding image, the recognizability of a target object, or the like, and that is subjectively set by a person. The goodness-of-fit index preferably indicates a higher value as the person finds the image more suitable.

Outline of Embodiment

The conventional technique relates to a method of generating a moving image with respect to a panoramic moving image by treating the panoramic moving image as a set of multiple panoramic still images to generate a normal moving image with respect to multiple panoramic images.

However, since scenes of the multiple panoramic images are not continuous, it is difficult for the moving image generation apparatus to adopt the conventional moving image generation method with respect to a panoramic moving image, which assumes a smooth change of the image between frames.

Further, there is a method of applying a conventional method of generating a moving image with respect to a single panoramic still image to each image and connecting the generated moving images. However, in this method, because each panoramic image is processed independently, a monotonous moving image may be generated due to similar camerawork being continuous.

In consideration of the above, in the present embodiment, when generating virtual camerawork with respect to a panoramic image to generate a moving image having a normal angle of view, similar camerawork types are prevented from being continuous by considering the goodness-of-fit index with respect to each panoramic image and the correlation between the panoramic images. Accordingly, a high-quality moving image having a normal angle of view can be generated from the panoramic image.

First Embodiment

As a first embodiment, an example in which a moving image generation apparatus adaptively allocates multiple fixed camerawork to each panoramic image to generate one moving image will be described. First, the preconditions will be described when describing the processing of the moving image generation apparatus.

The term "panoramic image" refers to an image captured at a wide angle, and the term "captured at a wide angle" refers to the image being captured wider than the angle of view of the output moving image. For example, in the present embodiment, even when the angle of view of the original image is 60 degrees, if the angle of view of the output moving image is less than 60 degrees, the original image is regarded as a panoramic image. Further, a spherical image taken in all directions of 360 degrees horizontally and 180 degrees vertically is also the panoramic image.

It is assumed that lens distortion and internal parameters of the camera that captured the panoramic image have been calibrated by another means, and a relative projection direction of each pixel of the panoramic image in the three-dimensional space is known. At this time, the panoramic image can be re-projected onto the two-dimensional unit sphere. Formally, the projection direction of pixel i is $(x_i, y_i, z_i) \in R^3$ (where $x_i^2 + y_i^2 + z_i^2 = 1$), and the pixel value of pixel i may be assigned to the position of the two-dimensional unit sphere $(x_i, y_i, z_i)$. Although positions of the pixels are discrete, the moving image generation apparatus can allocate the pixel values continuously on the two-dimensional unit sphere by interpolating using the nearest neighbor method, the bilinear method, the bicubic method, or the like. This two-dimensional unit sphere is hereinafter referred to as an "image sphere".

Next, the camerawork is defined. The term "camerawork" refers to time series data of parameters of the virtual camera that converts a panoramic image into a partial perspective projection image.

FIG. 1 is a diagram describing camera parameters and camerawork. The moving image generation apparatus projects a panoramic image onto the surface of the image sphere, and projects the surface of the image sphere onto a capture plane with a virtual camera to obtain a partial perspective projection image. As illustrated in FIG. 1(a), the parameters of the virtual camera include a projection center, an optical-axis direction, an optical-axis rotation, and a focal length. In addition, an aspect ratio, a lens distortion coefficient, and the like may be included in the parameters of the virtual camera. Typically, by aligning the projection center with the center of the image sphere, a natural perspective projection image without distortion can be obtained. When the projection center is on the surface of the image sphere and the center of the image sphere is on the optical-axis, the stereographic projection method is used to effectively capture the field of view of 180 degrees or more in a single plane image.

Further, as illustrated in FIG. 1(b), a camerawork type refers to a parameter used to generate camerawork with respect to an image. Formally, when an image set is X, a parameter set is Z, a camerawork set is Y, and mapping of camerawork generation is G: X×Z→Y, an element of the parameter set Z is called the camerawork type. In the first embodiment, the parameter set Z includes a finite number of elements and G makes the element of the parameter set Z correspond to one element of the camerawork set Y (therefore, the camerawork type is image independent).

Configuration Example

FIG. 2 illustrates an example of a hardware configuration diagram of a moving image generation apparatus 100. As illustrated in FIG. 2, the moving image generation apparatus 100 includes a central processing unit (CPU) 11, a read-only memory (ROM) 12, a random access memory (RAM) 13, an input device 14, a display device 15, and a connection interface (I/F) 16.

The CPU 11 centrally controls the operation of the moving image generation apparatus 100. The CPU 11 executes various control programs stored in the ROM 12 by using a predetermined area of the RAM 13 as a workspace to implement various functions of the moving image generation apparatus 100. Specific details of the functions of the moving image generation apparatus 100 will be described later.

The ROM 12 is a nonvolatile memory (non-rewritable memory) that stores programs and various kinds of setting information relating to the moving image generation apparatus 100. The RAM 13 is, for example, a storage device such as a synchronous dynamic random access memory (SDRAM). The RAM 13 functions as a workspace of the CPU 11 and temporarily stores programs and various kinds of data.

The input device 14 is a peripheral device used for accepting an input (an operation on a keyboard or a mouse, a voice-based operation, or the like) from a user. The display device 15 is a component or external peripheral device that displays various kinds of information relating to the moving image generation apparatus 100. The display device 15 is, for example, a liquid crystal display. Note that a touch panel to which the display device 15 and the input device 14 are integrated together may be used. The connection I/F 16 is an interface that connects the moving image generation apparatus 100 to an external device. For example, the connection I/F 16 may be a general-purpose interface such as a Universal Serial Bus (USB) interface or a communication interface that enables wired or wireless communication with an external device.

<Function of Moving Image Generation Apparatus>

Next, the functions of the moving image generation apparatus 100 according to the present embodiment will be described with reference to FIG. 3. FIG. 3 is an example of a functional block diagram illustrating the functions of the moving image generation apparatus 100 as blocks. The moving image generation apparatus 100 includes an image acquisition unit 101, an importance calculation unit 102, a goodness-of-fit index calculation unit 103, a type allocation unit 104, and a moving image encoding unit 105. These functional units of the moving image generation apparatus 100 are functions or units that are implemented by the CPU 11 executing a program that is loaded into the RAM 13 from the ROM 12 illustrated in FIG. 2. Note that this program may be distributed from a server used for the distribution of programs or may be distributed after being stored on a computer-readable recording medium such as a USB flash memory or an optical recording medium.

A storage device 20 illustrated in FIG. 3 is a device that stores a panoramic image. The storage device 20 may be, for example, a USB memory, an external HDD, a Network Attached Storage (NAS), a server, or any device that can store a panoramic image. Further, the storage device 20 may be provided inside the moving image generation apparatus 100.

Since the functions of the moving image generation apparatus 100 correspond to respective steps of a flowchart illustrated in FIG. 4, the functions of the moving image generation apparatus 100 will be described with reference to the flowchart.

FIG. 4 is an example of a flowchart illustrating a procedure in which the moving image generation apparatus 100 generates camerawork in the present embodiment. Description will be given below in accordance with the flowchart of FIG. 4.

(Processing Step S101)

In processing step S101, the image acquisition unit 101 acquires multiple panoramic images to be processed, from the storage device 20.

(Processing Step S102)

In processing step S102, the importance calculation unit 102 calculates an importance of each region in the obtained panoramic image. The importance calculation unit 102 preferably calculates the importance for each pixel, but the importance may be calculated with sub-pixel accuracy or may be calculated for each specific region.

The importance refers to an index representing the importance of a viewer's viewing the area, which is approximately calculated by the following method. One method is a method using visual prominence detection. The visual prominence detection includes a method of stacking individual rules bottom-up, such as setting high prominence for an edge or an isolated point, and a top-down estimating method from input images by using a machine learning method such as a neural network or support vector machine. Any method may be used in the present embodiment. Also, as an alternative to the visual prominence, a technician may set the object category with high importance in advance (for example, a person, a face, an animal, a car, or the like) and determine the region in which the object is detected by an object detection algorithm to be high importance. Alternatively, the importance calculation unit 102 may estimate a layout of the scene in the panoramic image, and estimate that the importance is high in a direction in which the radial composition, the rule of thirds, the horizontal composition, or the like of the scene is obtained. Alternatively, the importance calculation unit 102 may use attention obtained by an attention mechanism of the neural network as the importance. The attention mechanism refers to a mechanism for learning the relationship between elements or points of caution introduced in the Encoder-Decoder model mainly for the purpose of machine translation and image processing.

Note that the above-mentioned visual prominence detection, object detection, layout estimation, and attention mechanism can also be used in combination. Importance $I(v) \in R$ of the direction $v \in S^2$ ($S^2$ is the two-dimensional unit sphere) can be obtained through this step. In the following, $I: S^2 \rightarrow R$ is called an importance distribution I.

1. The importance distribution includes a combination of multiple probability distributions.
2. The individual probability distributions that make up the importance distribution are represented as element distributions.

(Processing Step S103)

In processing step S103, the goodness-of-fit index calculation unit 103 calculates the goodness-of-fit index of the camerawork type prepared in advance from the importance distribution I of the panoramic image.

FIG. 5 illustrates examples of the camerawork type. For example, as illustrated in FIG. 5, the camerawork type includes the following:

(a) a type in which the projection center is aligned with the center of the image sphere and the optical axis is moving horizontally from one end of the panoramic image to the other end (one rotation in the case of an all-around image);

(b) a type in which the direction of the optical axis is rotated by the stereographic projection method while the direction of the optical axis is fixed in the direction of gravity; and (c) a type in which the direction of the optical axis is rotated by the stereographic projection method while the direction of the optical axis is fixed in the direction opposite to gravity.

Each of these camerawork types has different features. (a) is suitable for moving image generation for horizontal wide-view, and (b) and (c) are suitable for moving image generation for overlooking a vertical wide field of view.

The goodness-of-fit index calculation unit 103 calculates the goodness-of-fit index of each camerawork type with respect to each panoramic image according to the importance distribution I. As a specific example, the importance distribution I can be modeled by the mixed von Mises-Fisher distribution, and the goodness-of-fit index of the camerawork type can be calculated from the parameters of the model. The mixed von Mises-Fisher distribution is a probability distribution having the probability density function of Math. 1 for a random variable $v \in S^2$.

[Math. 1]
$$p(v) = \sum_{k=1}^{K} \alpha_k C(\kappa_k) \exp(\kappa_k \langle \mu_k, v \rangle) \quad (1)$$

Each coefficient is as follows.

K is the number of element distributions.

$\alpha_k \in [0, 1]$ is a mixing ratio of the kth element distribution ($\sum_{k=1}^{K} \alpha_k = 1$).

$\mu_k \in S^2$ is a mean direction of the kth element distribution.

$\kappa_k \in R(\geq 0)$ is a degree of concentration of the kth element distribution ($\kappa$ is kappa).

$\langle \cdot, \cdot \rangle$ is an inner product (standard inner product in $R^3$).

$C(\kappa_K) \in R$ is a normalization constant that satisfies Math. 2.

[Math. 2]
$$\frac{1}{C(\kappa_k)} = \int_{S^2} \exp(\kappa_k \langle \mu_k, v \rangle) dv = \frac{4\pi \sinh \kappa}{\kappa} \quad (2)$$

FIG. 6 illustrates a visualization of an example of the mixed von Mises-Fisher distribution. In FIG. 6, the probability density is expressed by shading with respect to polar coordinates.

In the mixed von Mises-Fisher distribution, $\{\alpha_k, \mu_k, \kappa_k\}_{k=1}^{K}$ is the parameter.

The goodness-of-fit index calculation unit 103 obtains this parameter by maximum likelihood estimation with respect to the importance distribution I. Specifically, the goodness-of-fit index calculation unit 103 obtains $\{\alpha_k, \mu_k, \kappa_k\}_{k=1}^{K}$ that maximizes the log likelihood of Math. 3.

[Math. 3]
$$L(\{\alpha_k, \mu_k, \kappa_k\}_{k=1}^{K}) = \int_{S^2} I(v) \log p(v) dv \quad (3)$$

The maximization of the log likelihood of Math. 3 can be efficiently calculated by the Expectation Maximization (EM) algorithm. In such a way, the goodness-of-fit index calculation unit 103 calculates the goodness-of-fit index of each camerawork type from $\{\alpha_k, \mu_k, \kappa_k\}_{k=1}^{K}$ obtained by the above-described way. For example, the goodness-of-fit index of the horizontal movement camerawork type (a) is the goodness-of-fit index obtained by subtracting the average of the inner products of the mean direction $\mu_k$ and the gravity direction $g \in S^2$ from 1 (the value increases as the distribution of importance in the horizontal direction is wider). In stereographic projection rotation in the direction of gravity (b), the goodness-of-fit index is the average of the inner products of the mean direction $\mu_k$ and the direction of gravity $g \in S^2$ (the value increases as the element distribution in the direction of gravity is wider). In stereographic projection rotation in the direction of reverse gravity (c), the goodness-of-fit index is the average of the inner products of the mean direction $\mu_k$ and the direction of reverse gravity $-g \in S^2$ (the value increases as the element distribution in the direction of gravity is wider).

The method of calculating the goodness-of-fit index is not limited to these, and any method may be used as long as the camerawork type can be evaluated in a form that follows the distribution of importance. The goodness-of-fit index of the mth camerawork type with respect to the nth panoramic image obtained as described above is represented as Dnm.

(Processing Step S104)

In processing step S104, the camerawork type is allocated to each panoramic image using the goodness-of-fit index $\{Dnm\}^{N,M}_{n=1, m=1}$ of the camerawork type calculated by the type allocation unit 104. Here, N is the number of panoramic images, and M is the number of camerawork types. If a number of camerawork occurrences of the same type appear, the whole moving image becomes difficult to change. Therefore, the technician determines the minimum number B of occurrences (frequency of occurrence of each type of camerawork) of each type of camerawork in advance.

By optimizing the goodness-of-fit index with respect to each image after considering the frequency of occurrence of camerawork, the camerawork type suitable for each image can be allocated without being biased toward a particular camerawork type. For example, although Image 1 is suitable for camerawork type A when viewed alone, Image 2 has a higher goodness-of-fit index for camerawork type A than Image 1. Therefore, in the present embodiment, an interaction such as the camerawork type A being allocated to Image 2 having a higher goodness-of-fit index and the camerawork type B being allocated to Image 1 is performed. Accordingly, the same camerawork types are not continuous. The goodness-of-fit index with respect to each panoramic image and the correlation between the panoramic images can be considered.

Then, the type allocation unit 104 requests an allocation of the camerawork type to the panoramic image such that the sum of the goodness-of-fit indices is maximized. The allocation can be formulated as the next integer programming problem by introducing a variable $\tau_{nm}$ that takes 1 when assigning the mth camerawork type to the nth panoramic image and 0 otherwise (Math. 4).

[Math. 4]
$$\max_{\tau}: \sum_{n}^{N} \sum_{m}^{M} \tau_{nm} D_{mn} \quad (4)$$

subject to: $\sum_{m}^{M} \tau_{nm} = 1 (n = 1, 2, \ldots, N)$ $\sum_{n}^{M} \tau_{nm} \geq B(m = 1, 2, \ldots, M)$ The Branch-and-Bound method and metaheuristics (simulated annealing, genetic algorithms, tabu search, or the like) can be used to solve the integer programming problem. As a special case, when N=M and B=1, the exact solution can be obtained by the Hungarian algorithm.

(Processing Step S105)

In processing step S105, according to the camerawork specified by the set camerawork type, the moving image encoding unit 105 creates a moving image of partial perspective projection from each panoramic image, and encodes and outputs the moving image as one moving image. As described above, a moving image having a high-quality normal angle of view can be generated from panoramic images.

<Processing Variations>

Hereinafter, variations suitable for the first embodiment will be described.

(Processing Step S103)

In the parameter estimation of the mixed von Mises-Fisher distribution in the processing step S103, the estimation result can be stabilized by using the Bayes estimator. That is, the goodness-of-fit index calculation unit 103 sets a prior distribution with respect to the parameter $\{\alpha_k, \mu_k, \kappa_k\}_{k=1}^{K}$ to obtain the posterior distribution for the parameter. An approximation calculation can be implemented by using the variational Bayes estimator. Further, the goodness-of-fit index of the camerawork type can be calculated directly from the importance distribution without going through the parameter estimation of the distribution. For example, in the case of the horizontal movement camerawork type (a), the goodness-of-fit index calculation unit 103 may calculate the goodness-of-fit index by integrating the importance I(v) of the direction $v \in S^2$ using the weight related to the inner product with the gravity direction $g \in S^2$ as in Math. 5.

[Math. 5]

$$D(I) = \int_{S^2} (1 - \langle v, g \rangle) I(v) dv \quad (5)$$

The same idea can be used for the camerawork types (b) and (c) of the stereographic projection rotation in the (reverse) gravity direction, and the importance may be integrated by weighting with the inner product in the (reverse) gravity direction.

In processing step S103, a weight $\{w_{nm} \in R\}^{N,M}_{n=1, m=1}$ may be introduced into the evaluation function to adjust the selected camerawork type. Specifically, the evaluation function of Math. 4 is replaced with Math. 6.

[Math. 6]

$$\max_{\tau}: \sum_{n}^{N} \sum_{m}^{M} \tau_{nm} w_{nm} D_{mn} \quad (6)$$

According to the evaluation function of Math. 6, by adjusting the weight $\{w_{nm} \in R\}^{N,M}_{n=1, m=1}$, the frequency of occurrence of a specific camerawork type can be increased, or the frequency of occurrence of a camerawork type can be changed according to the order of occurrence of images.

With regard to a constraint, adding the constraint of Math. 7 so that the same camerawork types do not continue is also useful.

[Math. 7]

$$\tau_{nm} + \tau_{n+1,m} \leq 1 (n=1,2,\ldots,N-1; m=1,2,\ldots,M) \quad (7)$$

Further, in the above example, the goodness-of-fit index calculation unit 103 is heuristically designed to calculate the goodness-of-fit index. However, the goodness-of-fit index calculation function may be obtained by machine learning because manually designing the goodness-of-fit index calculation function takes time and effort and also the accuracy is limited. The technician presents the examinee with a moving image generated by a set of pre-created images and the camerawork type. A dataset with multiple groups {image, camerawork type, and goodness-of-fit index} is constructed by asking the examinee to provide a value for the goodness-of-fit index. Then, a method of learning a regression model D for estimating the goodness-of-fit index from {image, camerawork type} can be obtained. For the regression, linear regression, logistic regression, support vector regression, gradient boosting, neural network, or the like may be used.

According to the first embodiment described above, by allocating a camerawork type to each panoramic image based on the goodness-of-fit index and the frequency of occurrence of the camerawork type, a moving image by various camerawork types can be generated with respect to multiple panoramic images.

Further, the moving image generation apparatus incorporates the frequency of occurrence of the camerawork type into the constraints or the evaluation function and determines the allocation of the camerawork type to each panoramic image such that the sum of the goodness-of-fit indices of the camerawork types is maximized. As a result, suitable camerawork can be generated with respect to each panoramic image while preventing being biased toward a particular camerawork type.

Further, by calculating the goodness-of-fit index of the camerawork type according to the importance distribution in the image, camerawork that is adaptive to the content of the image can be generated.

Second Embodiment

As a second embodiment, a moving image generation apparatus that defines a camerawork type by classifying a set of parameters given to a camerawork generation module (camerawork generation unit 205 which will be described later) to generate one moving image from multiple panoramic images will be described.

Although camerawork for a camerawork type is fixed to one in the first embodiment, in the present embodiment, different camerawork is generated according to the content of the panoramic image even if the camerawork types are the same.

FIG. 7 is an example of a functional block diagram illustrating functions of a moving image generation apparatus according to the second embodiment as blocks. A moving image generation apparatus 100 of the present embodiment includes a camerawork generation unit 205 with respect to the moving image generation apparatus 100 of FIG. 3. These functions will be described with reference to FIG. 8.

FIG. 8 is an example of a flowchart illustrating a procedure in which the moving image generation apparatus 100 generates camerawork. Compared with FIG. 4, step S203 is different, and step S205 is added. In the following, the differences from FIG. 4 will be mainly described. Step S201 and step S202 may be the same as step S101 and step S102 in FIG. 4.

(Processing Step S203)

In processing step S203, the goodness-of-fit index calculation unit 203 calculates the goodness-of-fit index of the camerawork type prepared in advance from the importance distribution I of the panoramic image. A parameter (hereinafter, referred to as a generation parameter) in the camerawork generation unit 205 that generates camerawork from the importance distribution is defined in the camerawork type of the second embodiment.

Different camerawork is generated for the same importance distribution due to the difference in generation parameters. The generation parameter includes the number of intermediate compositions, a method of path interpolation, acceleration/deceleration rules, and the like.

FIG. 9 illustrates an example of a camerawork type according to the second embodiment. The following three camerawork types will be described as an example.
(d) The goodness-of-fit index calculation unit 203 generates a path in which a minute variation is given to one intermediate composition, and moves the camera on the path at a constant speed.
(e) The goodness-of-fit index calculation unit 203 generates a movement path by linear interpolation for two intermediate compositions, and moves the virtual camera on the path with acceleration/deceleration.
(f) The goodness-of-fit index calculation unit 203 generates a movement path by spline interpolation for three intermediate compositions, and moves the virtual camera on the path at a constant speed.

FIG. 15 illustrates a comparison of the features of camerawork types (d) to (e).

The goodness-of-fit index calculation unit 203 calculates the goodness-of-fit index from the importance distribution with respect to these camerawork types. First, the goodness-of-fit index calculation unit 203 models the importance distribution with the mixed von Mises-Fisher distribution in the same manner as in processing step S103, and obtains a parameter $\{\alpha_k, \mu_k, \kappa_k\}^K_{k=1}$ by maximum likelihood estimation.

Here, the number of element distributions K is adjusted to the maximum number of 3 for the number of intermediate compositions of the assumed camerawork type.

With respect to the camerawork type (d), the difference between the maximum value of the mixing ratio $\{\alpha_k\}^K_{k=1}$ and the average of other values is the goodness-of-fit index. That is, the goodness-of-fit index becomes higher as the importance is concentrated on one element distribution.

With respect to the camerawork type (e), the difference between the average and the minimum value of the mixing ratio $\{\alpha_k\}^K_{k=1}$ is the goodness-of-fit index. That is, the goodness-of-fit index becomes higher as the importance is concentrated on the two element distributions.

With respect to the camerawork type (f), the variance of the mixing ratio $\{\alpha_k\}^K_{k=1}$ is $\sigma^2$ and exp $(-\sigma^2)$ is the goodness-of-fit index. That is, the goodness-of-fit index becomes higher as the dispersion of the mixing ratio is small.

The goodness-of-fit index of the mth camerawork for the nth panoramic image obtained as described above is Anm.

(Processing Step S204)

In processing step S204, the camerawork is allocated to each panoramic image using the goodness-of-fit index $\{Dnm\}^{N,M}_{n=1, m=1}$ of the camerawork calculated by a type allocation unit 204. This processing is the same as processing step S104 in the first embodiment.

(Processing Step S205)

In processing step S205, the camerawork generation unit 205 generates camerawork with respect to each panoramic image based on the allocated camerawork type. Herein, an example will be described in which the camerawork generation unit 205 generates camerawork using a parameter $\{\alpha_k, \mu_k, \kappa_k\}^K_{k=1}$ of the mixed von Mises-Fisher distribution obtained in processing step S202.

That is, the camerawork generation unit 205 generates the camerawork by inputting a parameter related to the importance distribution of each region of the panoramic image and the panoramic image. The camerawork generation unit sets a parameter according to the camerawork type allocated by the type allocation unit.

With regard to the camerawork type (d), the camerawork generation unit 205 first selects the element distribution k that maximizes the mixing ratio $\{\alpha_k\}^K_{k=1}$. The mean direction $\mu_k$ of the element distribution is defined as an optical axis direction c of the virtual camera, and the camerawork generation unit 205 determines an angle of view $\gamma$ of the virtual camera from the degree of concentration $\kappa_k$. For example, Math. 8 may be used as a formula for calculating the angle of view $\gamma$ of the virtual camera from the degree of concentration $\kappa$.

[Math. 8]
$$\gamma = 2\cos^{-1}\frac{\log((1-\eta)e^\kappa + \eta e^{-\kappa})}{\kappa} \qquad (8)$$

$\eta \in (0,1)$ is a hyperparameter. The $\eta$ becomes greater as the $\gamma$ is greater, which is $\gamma \to 0$ ($\kappa \to 0$) and $\gamma \to 2\pi(\eta \to 1)$. This formulation is derived from the relational expression of the cumulative density function with respect to the central angle of the von Mises-Fisher distribution.

The camerawork generation unit 205 gives small variations in the optical axis direction c and the angle of view $\gamma$ to obtain (c1, $\gamma$1) and (c2, $\beta$2). Then, the camerawork generation unit 205 linearly interpolates these two points to generate the camerawork paths c(s) and $\gamma$(s). That is, the optical axis direction and the angle of view form a pair, and the camerawork generation unit 205 generates camerawork in which the parameter of the virtual camera transits between different pairs of optical axis directions and angles of view.

[Math. 9]
$$c(s) = (1-s)c_1 + sc_2 \qquad (9)$$
$$\gamma(s) = (1-s)\gamma_1 + s\gamma_2$$

$s \in [0,1]$. In the camerawork type (d), since the virtual camera moves at a constant speed, s is set as in Math. 10 for the times t=0, 1, . . . , T.

[Math. 10]
$$s(t) = \frac{t}{T} \qquad (10)$$

Next, with respect to the camerawork type (e), the camerawork generation unit 205 first selects two element distributions $k_1$ and $k_2$ from the higher mixing ratio $\{\alpha_k\}^K_{k=1}$. The camerawork generation unit 205 sets mean directions $\mu k_1$ and $\mu k_2$ of each element distribution as optical axis directions $c_1$ and $c_2$ of the virtual camera, and calculates angles of view $\gamma_1$ and $\gamma_2$ of the virtual camera from the degree of concentration $\kappa_{K1}$ and $\kappa_{K2}$ by Math. 8.

The intermediate composition 1 is assumed to be (c1, γ1) and the intermediate composition 2 is assumed to be (c2, γ2). The camerawork generation unit 205 uses Math. 9 to generate a path that transits between the two intermediate compositions by linear interpolation. Next, the camerawork generation unit 205 determines s with respect to the time t. Here, the camerawork generation unit 205 sets s as illustrated in Math. 11 by using a minimum jerk model as an acceleration/deceleration model.

[Math. 11]

$$s(t) = 6\left(\frac{t}{T}\right)^5 - 15\left(\frac{t}{T}\right)^4 + 10\left(\frac{t}{T}\right)^3 \quad (11)$$

The minimum jerk model is a model that generates an orbit between two points so that the integral value of the square of the jerk, which is the derivative of acceleration, is minimized. The minimum jerk model is known to reproduce the movement of the human hand adequately. The acceleration/deceleration model is not limited to the minimum jerk model, and any model may be used.

With respect to the camerawork type (f), the camerawork generation unit 205 sets the mean direction $\{\mu_k\}^K_{k=1}$ of each element distribution as an optical axis direction $\{c_k\}^K_{k=1}$ of the virtual camera and calculates the angle of view $\{\gamma_k\}^K_{k=1}$ of the virtual camera from the degree of concentration $\{\kappa_k\}^K_{k=1}$ by the Math. 8. As intermediate compositions of these, the camerawork generation unit 205 generates a path of a camera parameter passing through the intermediate composition by spline interpolation, and the virtual camera is assumed to move on the path at a constant speed.

(Processing Step S206)

In processing step S206, according to the set camerawork, a moving image encoding unit 206 creates a moving image of partial perspective projection from each panoramic image, and encodes and outputs the moving image as one moving image.

<Processing Variations>

Hereinafter, variations suitable for the second embodiment will be described.

As in the first embodiment, it is possible to apply the variational Bayesian method to the parameter estimation of the mixed von Mises-Fisher distribution, directly calculate the goodness-of-fit index from the importance distribution, and weight the evaluation function.

Further, the fixed camerawork of the first embodiment may be mixed with the camerawork of the second embodiment. Various camerawork types can be assumed depending on the combination of the number of intermediate compositions, a method of path interpolation, and acceleration/deceleration rules. Any other camerawork type can be considered (however, inconvenience occurs when the number of camerawork types is large, and it is preferable to apply the following third embodiment to solve the inconvenience).

According to the present embodiment, various camerawork can be generated for multiple panoramic images according to the content of the images.

The camerawork generation unit generates camerawork by inputting parameters related to the importance distribution of each region of the panoramic image and the panoramic image, thereby camerawork that is adaptive to the content of the image can be generated while preventing being biased toward a particular camerawork type.

By considering the importance distribution in a panoramic image as a mixture distribution (element distribution) of a probability distribution with multiple distributions for elements and generating camerawork according to the parameter of the element distribution, camerawork that is robustly adaptive to the content of the image can be generated.

Third Embodiment

As a third embodiment, when the number of camerawork types is very large relative to the number of input images or when there are infinite camera types as an extreme example, a moving image generation apparatus that allocates a camerawork type to each panoramic image to generate and output camerawork will be described.

In such a case, there may be a disadvantage that a moving image of similar camerawork continuing is generated because similar camerawork types are allocated to different panoramic images.

In the third embodiment, the moving image generation apparatus defines a distance between camerawork types and incorporates the distance into a constraint or an evaluation function to generate various types of camerawork.

FIG. 10 is an example of a functional block diagram illustrating functions of a moving image generation apparatus according to the third embodiment as blocks. A moving image generation apparatus 100 of the present embodiment is the same as the moving image generation apparatus 100 of FIG. 7. However, the processing contents of a goodness-of-fit index calculation unit 303 and a type allocation unit 304 are different. These functions will be described with reference to FIG. 11.

FIG. 11 is an example of a flowchart illustrating a procedure in which a moving image generation apparatus 100 generates camerawork. FIG. 11 is the same as FIG. 8, except that the contents of step S303 and step S304 are different. Hereinafter, the difference from FIG. 8 will be mainly described.

(Processing Step S303)

In processing step S303, the goodness-of-fit index calculation unit 303 calculates the goodness-of-fit index of the camerawork type from the importance distribution I of the panoramic image. Here, the camerawork type (f) of the second embodiment is used as an example. A moving image length T in Math. 10 is used as a variable to classify the camerawork type (for example, T=300 and T=500 are different camerawork types).

When classifying camerawork types, the extent of the importance distribution is considered. For example, as in processing step S103, the goodness-of-fit index calculation unit 103 obtains the parameter $\{\alpha_k, \mu_k, \kappa_k\}^K_{k=1}$ of the mixed von Mises-Fisher distribution with respect to the importance distribution I by maximum likelihood estimation. The variance of $\{\mu_k\}^K_{k=1}$ is the goodness-of-fit index of the camerawork type. In the following, the goodness-of-fit index of the camerawork type m for the nth panoramic image is represented as Dnm (in the above example, it is assumed that m=T).

(Processing Step S304)

In processing step S304, the camerawork is allocated to each panoramic image using the goodness-of-fit index Dnm of the camerawork calculated by a type allocation unit 304. Here, the type allocation unit 304 uses a distance d (m, m') between the camerawork types m, m'. This distance is a constraint. Typically, L2, L1, or the like may be used.

The camerawork type allocated to the nth panoramic image is $m_n$, and the optimization problem of Math. 12 is constructed.

[Math. 12]

$$\max: J(m) = \sum_{n=1}^{N} D_n(m_n) \quad (12)$$

$$\text{subject to: } d(m_i, m_j) \geq B(i = 1, 2, \ldots, N; j = 1, 2, \ldots, N)$$

The type allocation unit 304 solves the optimization problem to obtain the allocation $\{m_n\}_{n=1}^{N}$. As a solution to the optimization problem, if M=T is used in the above example, it becomes an integer programming problem and may be solved by a Branch-and-Bound method or metaheuristics (may be solved with the following method with linear relaxation). If $m_n$ is a real number, the problem is solved by constrained nonlinear programming such as the penalty function method, Lagrange's undetermined multiplier method, and generalized reduced gradient method.

(Processing Step S305)

In processing step S305, a camerawork generation unit 305 generates camerawork with respect to each panoramic image based on the allocated camerawork type. This processing is the same as processing step S205 in the second embodiment.

(Processing Step S306)

In processing step S306, according to the set camerawork, a moving image encoding unit 306 creates a moving image of partial perspective projection from each panoramic image, and encodes and outputs the moving image as one moving image.

<Processing Variations>

With regard to a constraint of processing step S304, instead of using a constraint with the distance between camerawork types, the distance can be incorporated into the evaluation function as illustrated in Math. 13.

[Math. 13]

$$\max: J(m) = \sum_{n=1}^{N} D_n(m_n) + \lambda \sum_{ij} d(m_i, m_j) \quad (13)$$

In Math. 13, $\lambda$ is a hyperparameter that adjusts the balance between the goodness-of-fit index and the distance between camerawork types. The optimization problem may be solved by an unconstrained nonlinear programming method (steepest descent method, Newton's method, conjugate gradient method, downhill simplex method, and the like) to obtain the camerawork type allocation.

Further, in the third embodiment, the moving image length T is used as the camerawork type, but not limited to this. Anything can be used as long as the goodness-of-fit index of the camerawork type and the distance between the camerawork types can be defined. For example, the number of intermediate compositions or the hyperparameter η that determines the angle of view conversion of the Math. 8 can be used as the camerawork type, also, the number of intermediate compositions and the hyperparameter η may be used in combination.

According to the present embodiment, it is possible to generate diverse and high-quality camerawork for multiple panoramic images even when many camerawork types exist. The high-quality means that the goodness-of-fit index with respect to each panoramic image is high, and the quality is high from the perspective of correlation between the panoramic images.

Further, the moving image generation apparatus incorporates the distance between the camerawork types into the constraints or the evaluation function and determines the allocation of the camerawork type to each panoramic image such that the sum of the goodness-of-fit indices of the camerawork types is maximized. As a result, suitable camerawork can be generated with respect to each panoramic image while preventing being biased toward similar camerawork types.

Fourth Embodiment

As a fourth embodiment, an example in which a Conditional Generative Adversarial Network (hereinafter, abbreviated as CGAN) is used for camerawork generation will be described. In the framework of CGAN, a panoramic image x and a latent variable z can be input to a generating function G to obtain camerawork y=G(x, z). Since the variation of the camerawork can be obtained by the latent variable z, the latent variable z can be regarded as the camerawork type in the fourth embodiment.

Further, in CGAN, a discriminant function D of the camerawork is acquired in the process of learning, and the value of D(x, y) increases as the generated camerawork y is closer to the camerawork included in the training data. Note that the D(x, y) is regarded as the goodness-of-fit index in the fourth embodiment.

As the distance between camerawork types, the distance in the space of the latent variable z is used. In such a way, even when CGAN is used as a camerawork generation method, the camerawork can be generated in consideration of the goodness-of-fit index with respect to each panoramic image and the correlation between the panoramic images.

FIG. 12 is an example of a functional block diagram illustrating functions of a moving image generation apparatus 100 according to the fourth embodiment as blocks. The moving image generation apparatus 100 of the present embodiment is the same as the moving image generation apparatus 100 of FIG. 10, except that the arrangement of the goodness-of-fit index calculation unit 403 is different. These functions will be described with reference to FIG. 13.

FIG. 13 is an example of a flowchart illustrating a procedure in which the moving image generation apparatus 100 generates camerawork. The goodness-of-fit index calculation step is not included in FIG. 13 as compared to FIG. 11. Hereinafter, the difference from FIG. 11 will be mainly described.

(Processing Step S403)

In process step S403, a type allocation unit 404 allocates camerawork with respect to each panoramic image. Similar to the third embodiment, allocating the camerawork type is performed by solving the optimization problem related to the distance between camerawork types. In this regard, in the fourth embodiment, the optimization problem of Math. 14 is constructed.

[Math. 14]

$$\max_z: \sum_{n=1}^{N} D(x_n, G(x_n, z_n)) \quad (14)$$

subject to: $d(z_i, z_j) \geq B(i = 1, 2, \ldots, N; j = 1, 2, \ldots, N)$

In Math. 14, it is assumed that a set of images is X, a set of camerawork types is $Z \subset R^{Dz}$, a set of camerawork is Y, $x_n \in X$, $z_n \in Z$ (n=1, 2, . . . , N), and a generating function G: $X \times Z \to Y$ and a discriminant function D: $X \times Y \to [0, 1]$ are obtained in advance by adversarial training in CGAN.

The discriminant function D outputs a value close to 1 if a pair of input image and camerawork is close to the training data, and close to 0 if the pair is far from the training data. This is regarded as the goodness-of-fit index of the camerawork type.

FIG. 14 is a diagram schematically illustrating the goodness-of-fit index output from the camerawork type and the panoramic image in CGAN. A panoramic image x (reference numeral 21) and a camerawork type z (reference numeral 22) are input to the generating function G (reference numeral 23), and camerawork y (reference numeral 24) is output. Further, the panoramic image x and the camerawork y are input to the discriminant function D (reference numeral 25), and the goodness-of-fit index (reference numeral 26) is output.

Further, a distance d in the space of the latent variable (camerawork type) is set as a constraint. The type allocation unit 404 obtains the allocation of the camerawork type to the panoramic image that maximizes the sum of the goodness-of-fit index, with the distance d as a constraint.

Random search, hill climbing, or metaheuristics may be used to solve the optimization problem. Since the calculation cost is high to calculate the goodness-of-fit index for the combination of the panoramic image and the camerawork type in advance as in the first, second, and third embodiments (in the first place, if the concentration of Z is infinite, the calculation is impossible), the goodness-of-fit index calculation unit 403 calculates $D(x_n, G(x_n, z_n))$ whenever the value of the discriminant function D is required in the optimization process.

(Processing Step S404)

In processing step S404, the camerawork generation unit 405 generates camerawork with respect to each panoramic image based on the allocated camerawork type. That is, $G(x_n, z_n)$ (n=1, 2, . . . , N) is calculated with respect to $z_n$ obtained by optimization.

(Processing Step S405)

In processing step S405, according to the set camerawork, a moving image encoding unit 406 creates a moving image of partial perspective projection from each panoramic image, and encodes and outputs the moving image as one moving image.

<Processing Variations>

Any configuration can be used for the generating function G and the discriminant function D. As a configuration example of the generating function G, after combining the camerawork types in the channel direction of the input image, a feature value may be calculated by processing with a Convolutional Neural Network (CNN), and the camerawork that is time series data may be output by Recurrent Neural Network (RNN), Gated Recurrent Unit (GRU), Long Short-Term Memory (LSTM), or Transformer.

The discriminant function D uses image data and time series data as input, and extracts the feature value using CNN for the image data and RNN, GRU, LSTM, and Transformer for the time series data. Then, the discriminant function D preferably combines the feature value and then performs the treatment with the whole combined layer.

In the above example, Euclidean space is assumed for the set of camera parameter types Z, but it is not limited to this. When the set Z is composed of a small number of countable elements, the goodness-of-fit index may be calculated in advance before the optimization calculation as in the first, second, and third embodiments.

According to the fourth embodiment, by using CGAN to generate a moving image for multiple panoramic images, CGAN can construct a camerawork generating function and a goodness-of-fit index calculation function (discriminant function) in a data-driven manner. Therefore, if a sufficient amount of training data exists, diverse and high-quality camerawork can be generated.

Other Application Examples

While the embodiments of the present disclosure have been described above, the present disclosure is not limited to such embodiments. Thus, various modifications and replacements may be made within the scope not departing from the gist of the present disclosure.

For example, the present embodiments are applicable, as well as to the generation of a 3D CG moving image, to a virtual reality system.

A moving image generated according to the present embodiments are applicable to advertisements. In addition, the present embodiments allow a viewer to effectively browse merchandise and services by distributing the moving image at various electronic commerce (EC) sites.

In addition, in the present embodiments, some processing is implemented by machine learning. Machine learning is a technique allowing a computer to obtain a learning ability such as that of a person and is a technique for autonomously generating an algorithm used for determination such as data classification from training data that is obtained in advance and for applying the algorithm to new data to perform prediction. The machine learning method may be any of supervised learning, unsupervised learning, semi-supervised learning, reinforcement learning, and deep learning, or any combination of these. That is, any machine learning method may be used.

The configuration examples illustrated in FIG. 3 and the other drawings presented in the embodiments described above are examples in which each process performed by the moving image generation apparatus 100 is divided in accordance with main functions for ease of understanding. However, the present disclosure is not limited by the way in which each process is divided into processing units or the names of the processing units. The moving image generation apparatus 100 may be divided into a greater number of processing units depending on the content of the process. In addition, the division may be performed so that one processing unit contains more processing.

Each of the functions of the above-described embodiments may be implemented by one or more pieces of processing circuitry. Here, the term "processing circuitry" used herein refers to a processor that is programmed to carry out each function by software such as a processor implemented by an electronic circuit, or a device such as an application specific integrated circuit (ASIC), digital signal processor (DSP), field programmable gate array (FPGA)

19 that is desired to carry out each function described above, or a conventional circuit module.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

REFERENCE SIGNS LIST 100 moving image generation apparatus
101, 201, 301, 401 image acquisition unit
102, 202, 302, 402 importance calculation unit
103, 203, 303, 403 goodness-of-fit-index calculation unit
104, 204, 304, 404 type allocation unit
105, 206, 306, 406 moving image encoding unit
205, 305, 405 camerawork generation unit

CITATION LIST

Patent Literature

[Patent Literature 1] Japanese Patent No. 6432029
[Patent Literature 2] Japanese Laid-Open Patent Application Publication No. 2004-241834
[Patent Literature 3] Japanese Patent No. 5861499
[Patent Literature 4] Japanese Laid-Open Patent Application Publication No. 2018-151887

The invention claimed is:

1. A moving image generation apparatus for generating a moving image having a normal angle of view from a plurality of panoramic images, the moving image generation apparatus comprising:
    goodness-of-fit-index calculation circuitry configured to calculate goodness-of-fit-indices of camerawork types of a virtual camera with respect to the plurality of panoramic images, wherein the goodness-of-fit-indices are indices that are calculated according to an importance distribution of each region in a panoramic image of the plurality of panoramic images;
    type allocation circuitry configured to determine an allocation of the camerawork types to the plurality of panoramic images based on the goodness-of-fit-indices and a frequency of occurrence of each camerawork type, and similar camerawork types are prevented from being continuous; and
    moving image encoding circuitry configured to create the moving image having the normal angle of view from the plurality of panoramic images with the allocated camerawork types, wherein the normal angle of view has a narrower angle of view compared to the panoramic images, and the camerawork type is parameters for converting a partial region of the panoramic images into the moving image having the normal angle of view.

2. The moving image generation apparatus according to claim 1, wherein the type allocation circuitry incorporates the frequency of occurrence of the camerawork types into a constraint or an evaluation function, and determines the allocation of the camerawork types to the plurality of panoramic images such that a sum of goodness-of-fit indices of the camerawork types represented by the constraint or the evaluation function is maximized.

3. The moving image generation apparatus according to claim 1, wherein the type allocation circuitry incorporates a distance between the camerawork types into a constraint or

20 an evaluation function, and determines the allocation of the camerawork types to the plurality of panoramic images such that a sum of goodness-of-fit indices of the camerawork types represented by the constraint or the evaluation function is maximized.

4. The moving image generation apparatus according to claim 1, further comprising importance calculation circuitry configured to calculate an importance of each region of the panoramic image.

5. The moving image generation apparatus according to claim 1, further comprising camerawork generation circuitry configured to generate camerawork by inputting a parameter related to an importance distribution of each region of the panoramic image and the panoramic image,
    wherein the camerawork generation circuitry sets the parameter according to the camerawork types allocated by the type allocation circuitry.

6. The moving image generation apparatus according to claim 5, further comprising importance calculation circuitry configured to calculate an importance of each region of the panoramic image,
    wherein the camerawork generation circuitry regards the importance distribution in the panoramic image as a mixture distribution of a probability distribution having a plurality of distributions as elements, and generates the camerawork according to a parameter of the mixture distribution.

7. The moving image generation apparatus according to claim 6, wherein the probability distribution is a von Mises-Fisher distribution,
    the camerawork generation circuitry sets a mean direction of an element distribution as an optical axis direction of the virtual camera to determine an angle of view of the virtual camera according to a degree of concentration of the element distribution, and
    generates the camerawork in which, the optical axis direction and the angle of view forming a pair, a parameter of the virtual camera transits between different pairs of optical axis directions and angles of view.

8. The moving image generation apparatus according to claim 6, wherein the probability distribution is a von Mises-Fisher distribution.

9. The moving image generation apparatus according to claim 6, wherein the probability distribution is a von Mises-Fisher distribution, and
    the camerawork generation circuitry sets a mean direction of an element distribution as an optical axis direction of the virtual camera to determine an angle of view of the virtual camera according to a degree of concentration of the element distribution.

10. The moving image generation apparatus according to claim 5, wherein the camerawork generation circuitry is implemented by a conditional generative adversarial network, and
    the camerawork generation circuitry uses a latent variable in the conditional generative adversarial network as the camerawork type and uses the panoramic image and the camerawork type as an input in the conditional generative adversarial network to generate the camerawork.

11. The moving image generation apparatus according to claim 10, wherein the type allocation circuitry incorporates a distance in a space of the latent variable into a constraint or an evaluation function, and determines the allocation of the camerawork types to the plurality of panoramic images such that a sum of goodness-of-fit indices, output from a discriminant function with respect to the generated camerawork, is maximized.

12. The moving image generation apparatus according to claim 1, wherein the type allocation circuitry incorporates the frequency of occurrence of the camerawork types into a constraint or an evaluation function.

13. The moving image generation apparatus according to claim 1, further comprising camerawork generation circuitry configured to generate camerawork by inputting a parameter related to an importance distribution of each region of the panoramic image and the panoramic image.

14. A moving image generation method performed by a moving image generation apparatus for generating a moving image having a normal angle of view from a plurality of panoramic images, the moving image generation method comprising:

calculating goodness-of-fit-indices of camerawork types of a virtual camera with respect to the plurality of panoramic images, wherein the goodness-of-fit-indices are indices that are calculated according to an importance distribution of each region in a panoramic image of the plurality of panoramic images;

determining an allocation of the camerawork types to the plurality of panoramic images based on the goodness-of-fit-indices and a frequency of occurrence of each camerawork type, and preventing similar camerawork types from being continuous; and creating the moving image having the normal angle of view from the plurality of panoramic images with the allocated camerawork types, wherein the normal angle of view has a narrower angle of view compared to the panoramic images, and the camerawork type is parameters for converting a partial region of the panoramic images into the moving image having the normal angle of view.

15. A non-transitory computer-readable recording medium having a program stored thereon, the program causing a moving image generation apparatus for generating a moving image having a normal angle of view from a plurality of panoramic images, the program which when executed by circuitry implements a process, the process comprising:

calculating goodness-of-fit-indices of camerawork types of a virtual camera with respect to the plurality of panoramic images, wherein the goodness-of-fit-indices are indices that are calculated according to an importance distribution of each region in a panoramic image of the plurality of panoramic images;

determining an allocation of the camerawork types to the plurality of panoramic images based on the goodness-of-fit-indices and a frequency of occurrence of each camerawork type, and preventing similar camerawork types from being continuous; and creating the moving image having the normal angle of view from the plurality of panoramic images with the allocated camerawork types, wherein the normal angle of view has a narrower angle of view compared to the panoramic images, and the camerawork type is parameters for converting a partial region of the panoramic images into the moving image having the normal angle of view.

* * * * *